(12) United States Patent
Aldereguia et al.

(10) Patent No.: US 7,512,854 B2
(45) Date of Patent: Mar. 31, 2009

(54) METHOD AND APPARATUS FOR TESTING, CHARACTERIZING AND MONITORING A CHIP INTERFACE USING A SECOND DATA PATH

(75) Inventors: Alfredo Aldereguia, Cary, NC (US); Brian Lee Koehler, Rochester, MN (US); Grace Ann Richter, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 11/064,752

(22) Filed: Feb. 24, 2005

(65) Prior Publication Data

US 2006/0190642 A1 Aug. 24, 2006

(51) Int. Cl.
*G01R 31/28* (2006.01)
*G01R 31/00* (2006.01)

(52) U.S. Cl. .................. 714/731; 714/735; 714/715; 702/58; 702/59; 702/118

(58) Field of Classification Search ................. 714/731, 714/735, 715; 702/58, 59, 118
See application file for complete search history.

(56) References Cited

U.S. PATENT DOCUMENTS

| 4,984,133 | A  | * | 1/1991 | Casanova et al. | ........... 361/683 |
| 6,421,784 | B1 |   | 7/2002 | Chu et al. | |
| 6,735,543 | B2 |   | 5/2004 | Douskey et al. | |
| 6,996,202 | B2 | * | 2/2006 | McCormack et al. | ....... 375/355 |

\* cited by examiner

*Primary Examiner*—Cynthia Britt
*Assistant Examiner*—John J Tabone, Jr.
(74) *Attorney, Agent, or Firm*—Matthew J. Bussan

(57) ABSTRACT

A data receiver circuit in a receiving chip provides the capability to characterize an interface, which includes one or more inter-chip communication lines, between a transmitting chip and the receiving chip by transmitting the data across a primary data path and a secondary data path, latching the data in the secondary data path using a clock signal that is skewed relative to a clock signal used to latch the primary data path, comparing the data latched from the primary and secondary data paths, and recording errors. Because the primary data path is not impacted by the test cycle, the test cycle may be run while data associated with applications running on the system are transmitted across the inter-chip communication lines.

33 Claims, 14 Drawing Sheets

METHOD AND APPARATUS FOR TESTING, CHARACTERIZING AND MONITORING A CHIP INTERFACE USING A SECOND DATA PATH

BACKGROUND OF THE INVENTION

1. Field of Invention

The present invention relates in general to the digital data processing field. More particularly, the present invention relates to testing, characterizing and monitoring chip interfaces for communicating data between integrated circuit chips.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data form one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore, continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). For example, if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase clock speed of the processor, and accordingly increase system speed.

Despite the enormous improvement in speed obtained from integrating circuitry, the demand for ever faster computer systems has continued. Hardware designers have been able to obtain still further improvements in speed by greater integration (i.e., increasing the number of circuits packed onto a single chip), by further reducing the size of circuits, and by various other techniques. For example, it has been possible to increase the width of various data buses to transfer more data with each bus cycle. This is true for serial links as well. Additional improvements have been made possible by increasing parallelism, and specifically, by employing multiple processors. The modest cost of individual processors packaged on integrated circuit chips has made multi-processor systems practical, although such multiple processors add more layers of complexity to a system.

These various development trends in the design of computers and other digital data processing devices have had the effect of increasing the number of I/O pin on integrated circuit chips, and consequently, of increasing the number of data signal lines which communicate data from one chip to another over buses and links.

Inter-chip communication lines are often arranged as buses or links having a defined protocol associated with a clock signal. To maximize overall system throughput, a fast clock is desirable, and designers are often pushing the envelope to obtain the fastest possible clock speed that the hardware will allow.

Where numerous inter-chip communication lines connect multiple ports on multiple chips, all simultaneously communicating data, various factors can degrade the signals received by a receiving chip. This degradation is not uniform. Each line has a different physical location on a circuit card, cable, or other carrier, it will lie adjacent a unique set of signal lines, and will have a unique driver circuit. It is therefore inevitable that some lines will exhibit a greater signal degradation, and will be more prone to soft (i.e., intermittent, non-repeatable) errors, than others.

In general, signal degradation may take the form of a phase shift, a voltage shift, or a purely random signal variation. A phase shift in the signal received by the receiving chip may be caused, for example, by capacitance in the inter-chip single line. Since each line has a different physical lay-out, the line capacitance (and the amount of phase shift) will vary with each line. A phase shift may also be caused by a clock skew within the transmitting chip, which again might vary from chip to chip. A voltage shift may be caused, for example, by power variations in the transmitting chip's drivers. Random variations in the signal have many possible causes too numerous to mention, but in general certain conditions make a line more susceptible to variation, such as physical length of the line, the strength of the drivers, etc. It will therefore be expected that some lines exhibit more random variation than others.

At some point, the clock signal regulating a chip-to-chip interface can be made to run slow enough so that variations in phase shift of the signal from line to line will not cause problems for the receiver. However, slowing the clock signal to accommodate the worst case signal line may adversely affect system throughput. As the number of signal lines increases, the variation of the worst case line is likely to be more extreme, requiring further slowing of the clock.

Historically, interfaces are often characterized and debugged in the development process using special test equipment, which is coupled to the signal lines to observe what is happening. As the number and density of lines increases, connecting test probes to individual lines is increasingly difficult and time consuming. Additionally, any test probe and attached apparatus has some finite impedance, which can distort the single being characterized. When transmission errors are of an intermittent and infrequent nature, such conventional testing equipment is often inadequate to the task of characterizing the interface.

Recently, some chips have been designed with "elastic" interfaces, in which the timing of the individual signal line receiver circuits can be varied to accommodate the individual variations in the line capacitance and so forth. These elastic interfaces are typically tuned during system design by measuring phase skew of the lines. Tuning elastic interfaces according to these techniques is a time-consuming process, which only promises to become more difficult as the number of inter-chip communication lines increases in future designs. Moreover, such tuning does not necessarily take other signal degrading factors into account, including signal degrading factors that occur in the field when the system is installed and placed in service after having been designed, and does not necessarily obtain optimal results.

More recently, chips have been designed with elastic inter-chip interfaces that can be tuned on an individual line basis to reduce errors by altering threshold detection voltage, signal delay, and/or driver power. In U.S. Pat. No. 6,735,543, for example, a tunable and characterizable interface is disclosed that supports the accurate determination of low error rates on an individual line basis for various tuning parameter settings. In that patent, an inter-chip transmission circuit in a transmitting chip and a complementary receiving circuit in a receiving chip are disclosed that provide the capability to characterize the inter-chip interface by separately generating identical pseudo-random test data at both chips, comparing the data, and recording errors.

In a multi-node system that uses serial links to communicate and maintain synchronization of tightly coupled processors, such as those used in symmetric multiprocessing (SMP), the amount of data going through the links is large. These links typically connect expansion ports, such as SMP expansion ports and remote expansion enclosure (RXE) expansion ports, using cables that incorporate multiple communication lines. The performance and serviceability of such systems hinge on the ability to maintain low error rates and detect errors and failures in these links. These links are very sensitive to voltage differences between links, cable length, attenuation, impedance matching, etc. Fluctuations in board impedance, voltage regulators within circuit boards, cables and other factors also impact the performance of the link (also referred to herein as "link errors"). These fluctuations and the sensitivity of the links can create problems when designing, manufacturing, installing and using multi-node systems. Moreover, link errors are also impacted by the type of data being sent across the link. For example, link errors vary as a function of sending random data versus pattern data, or sending data associated with different application programs. Consequently, merely checking for errors in the link using one type of data, e.g., using random data, is not a good predictor of the performance of the link for other types of data. For example, if data associated with an application program being run by the system is transmitted across the link instead of random data, link errors could increase or decrease. Similarly, if the application program being run by the system changes, link errors could increase or decrease.

Two conventional techniques that are used to determine the performance of a link are the "ping" test and the construction of a "bathtub curve". These techniques are used in system design, manufacture, and in the field. The ping test sends large amounts of random data across a link and performance counters in the receiving chip calculate the performance of the link, e.g., an error rate of the link. In the ping test, a linear feedback shift register (LSFR) in the transmitting chip is typically used to generate pseudo-random data. This data is transmitted in a packet having a header, data, trailer, and an appended cyclic redundancy check (CRC). The header contains information such as the type of packet, the length of the packet, etc. The receiver circuit in the receiver chip checks the header to determine the length of the packet, runs through the CRC algorithm, and compares the result with the CRC appended to the trailer. If the comparison results in a match, then the packet was transmitted and received successfully. If the comparison results in a miscompare, then the packet was not transmitted and received successfully and an error is logged. The packets are repeatedly transmitted across the link to determine an error rate.

A problem with the ping test is that it is a point test, i.e., tuning parameters such as signal delay are not varied. Accordingly, the ping test does not provide guardband data (also referred to herein as "margin" data) indicative of the performance of the link with respect to varied parameters which may change over the life of the system. In addition, because the ping test checks for errors in the link using one type of data, i.e., using random data, the ping test in not a good predictor of the performance of the link for other types of data. For example, if data associated with an application program subsequently run by the system is transmitted across the link instead of random data, the error rate of the link could increase or decrease.

The second conventional technique that is used to determine the performance of a link is the construction of a bathtub curve. In essence, this technique is performed by running the ping test multiple times while a signal delay is changed in a step-wise fashion. During a bathtub curve test, the signal delay is shifted in increments and/or decrements using a programmable delay line in the data path within the receiver circuit of the receiver chip. A bathtub curve is constructed by plotting the error rate as a function of signal delay. An important advantage of constructing a bathtub curve is that it provides a "window of guardband" (also referred to herein as "timing margin" and "eye opening") in the results. A window of guardband is the width of the bathtub curve at a given error rate. However, running the bathtub curve test requires bringing the system down because clocks must be stopped in the chips to read and set data. In addition, because construction of a bathtub curve according to current techniques checks for errors in the link using one type of data, i.e., using random data, the ping test is not a good predictor of the performance of the link for other types of data. For example, if data associated with an application program subsequently run by the system is transmitted across the link instead of random data, the error rate of the link could increase or decrease.

In order to design and produce systems of increased complexity, and in particular, multi-node systems that use links having an increased number of communication lines operating at high clock rates, it would be desirable to provide improved techniques for testing, characterizing and monitoring the communication lines that reflect timing margin while the system is running an application program and transmitting data associated with the application program across the communication lines.

SUMMARY OF THE INVENTION

A data receiver circuit in a receiving chip provides the capability to characterize an interface, which includes one or more inter-chip communication lines, between a transmitting chip and the receiving chip by transmitting the data across a primary data path and a secondary data path, latching the data in the secondary data path using a clock signal that is skewed relative to a clock signal used to latch the primary data path, comparing the data latched from the primary and secondary data paths, and recording errors. Because the primary data path is not impacted by the test cycle, the test cycle may be run while data associated with applications running on the system are transmitted across the inter-chip communication lines.

In the preferred embodiment, the data receiver circuit includes a variable delay circuit that provides the clock signal for latching the secondary data path by skewing, in a plurality of delay increments and/or decrements, the clock signal for latching the primary data path. The data receiver circuit also preferably contains a counter for counting errors and a counter for counting bits transmitted during the test cycle. The counters support testing a large number of test cycles to accurately determine the bounds of a bathtub curve at low error frequencies.

The primary and secondary data paths preferably each have a programmable delay line and a fixed delay line having a plurality of taps. During normal operation, the programmable delay line and a tap selection of the fixed delay line in the primary data path are tuned. However, the programmable delay line and the tap selection of the fixed delay line in the primary and secondary data paths are preferably equalized and frozen during a test cycle to monitor an error rate. Application data may be transmitted across the inter-chip communication lines during the test cycle.

A characterizable interface in accordance with the preferred embodiment of the present invention supports the accurate determination of low frequency intermittent errors on an individual line basis for a plurality of signal delay settings. Characterization can be accomplished under realistic operating conditions when data associated with an application program is transmitted across the inter-chip communication lines. Systems designers may therefore test, characterize, and monitor the inter-chip interfaces on an individual line basis after the chips and the circuit boards to which they are mounted have been designed and constructed. While the primary benefit is assumed to be understanding the interface in the system design phase, such capability could further be used to test, characterize and monitor chips during manufacturing to account for manufacturing variations, or in the field to account for variations in operating environment, aging, and so forth.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1A:
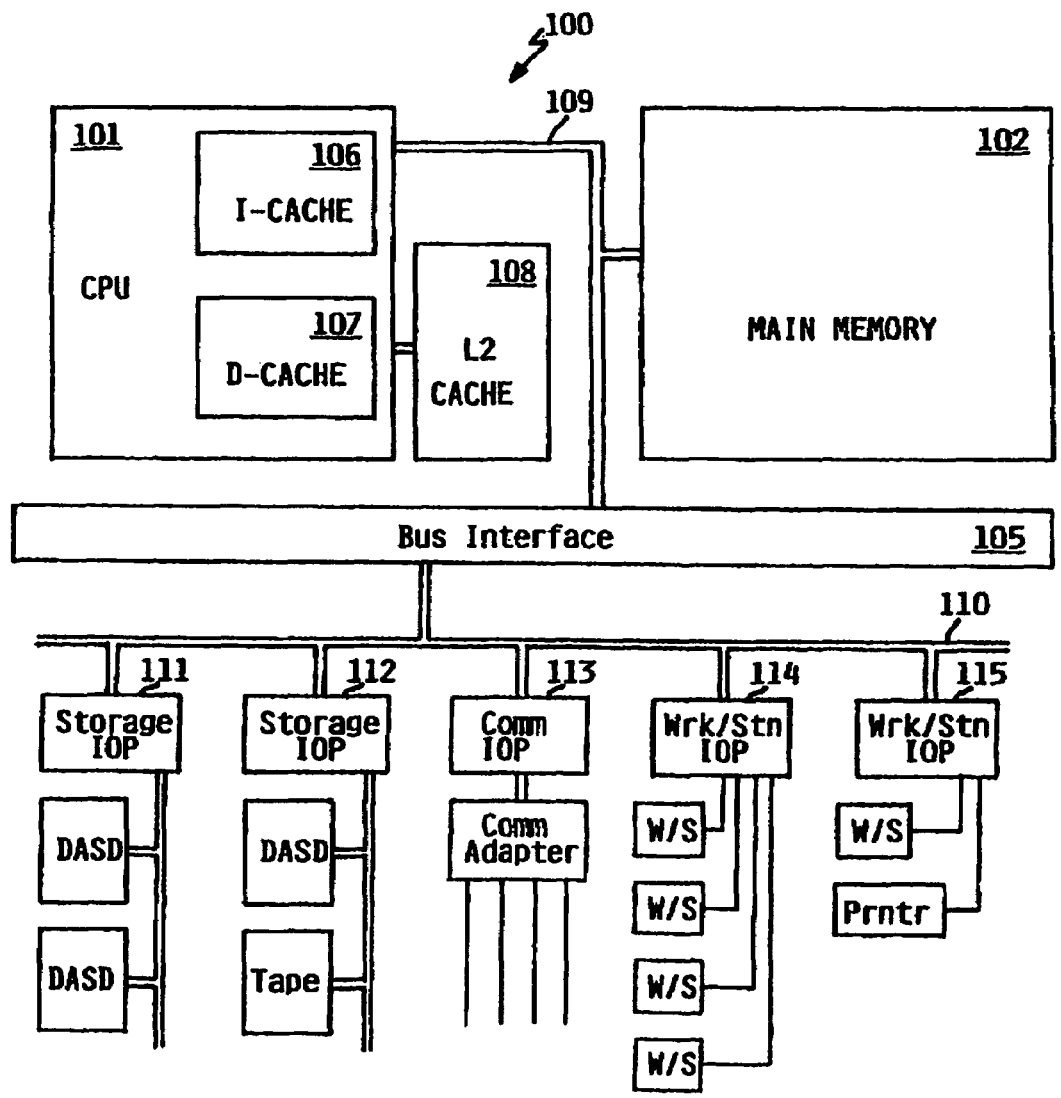
FIG. 1A is a high-level block diagram of the major hardware components of a single-CPU computer system for utilizing an inter-chip interface, according to the preferred embodiment of the present invention.

Referring to the Drawing, wherein like numbers denote like parts throughout the several views, FIG. 1A is a high-level representation of the major hardware components of a single-CPU computer system 100 for utilizing an inter-chip interface, according to the preferred embodiment of the present invention. CPU 101 processes instructions and data from main memory 102. CPU 101 temporarily holds instructions and data in a cache structure for more rapid access. In the embodiment of FIG. 1A, the cache structure is shown as separate internal level one instruction cache 106 (L1 I-cache) and level one data cache 107 (L1 D-cache), and level two cache 108 (L2 cache) closely coupled to CPU 101. However, it should be understood that the cache structure may be different; that the number of levels and division of function in the cache may vary; and that a system might in fact have no cache at all. L1 I-cache 106 stores instructions for execution by CPU 101. L1 D-cache 107 stores data (other than instructions) to be processed by CPU 101. L2 cache 108 can be used to hold both instructions and data.

Memory bus 109 provides a data communication path for transferring data among CPU 101, main memory 102 and I/O bus interface 105, which is further coupled to system I/O bus interface 105, which is further coupled to system I/O bus 110 for transferring data to and from various I/O units. I/O bus interface 105 communicates with multiple I/O processing units (IOPs) 111-115 through system I/O bus 110. System I/O bus 110 may be, for example, an industry standard PCI bus. The IOPs support communication with a variety of storage and I/O devices, such as direct access storage devices (DASD), tape drives, workstations, printers, and remote communications lines for communication with remote devices or other computer systems.

It should be noted that FIG. 1A is intended to depict the representative major components of system 100 at a high level, that individual components may have greater complexity than represented in FIG. 1A, and that the number, type and configuration of such components may vary. In particular, system 100 may contain multiple CPUs. Such a multiple-CPU system is depicted at a high level in FIG. 1B.

Figure 1B:
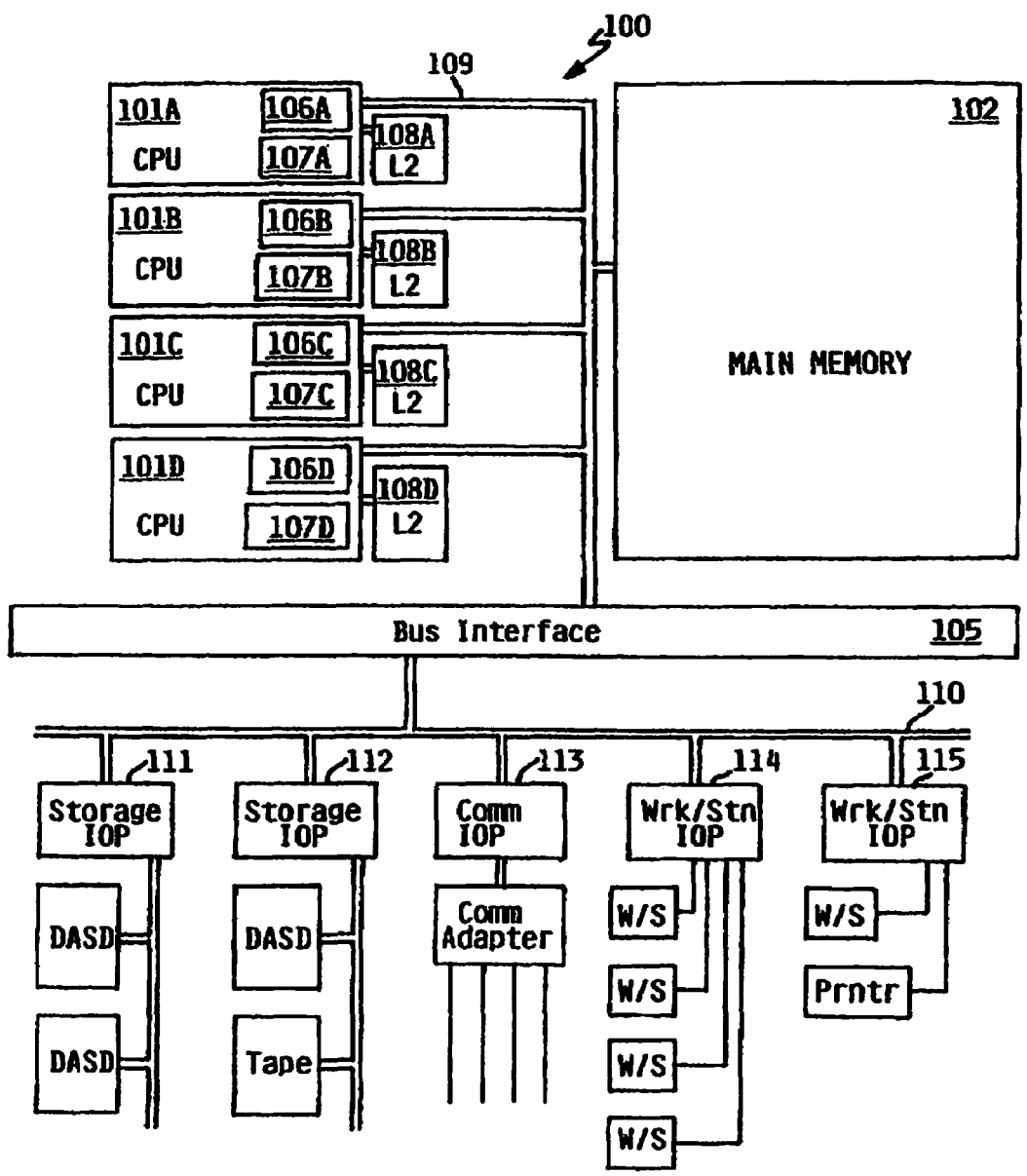
FIG. 1B is a high-level block diagram of the major hardware components of a multiple-CPU computer system for utilizing an inter-chip interface, according to the preferred embodiment of the present invention.

FIG. 1B shows a system having four CPUs 101A, 101B, 101C, 101D, each CPU having a respective L1 I-cache, 106A, 106B, 106C, 106D, and respectively L1 D-cache 107A, 107B, 107C, 107D. A separate L2 cache 108A, 108B, 108C, 108D for instructions and data is associated with each CPU. As used herein, CPU and caches are referenced by generic reference numbers as CPU 101, L1 I-cache 106, L1 D-cache 107 and L2 cache 108, it being understood that such devices could be contained either in a single CPU system as shown in FIG. 1A or a multiple-CPU system as shown in FIGS. 1B.

In FIGS. 1A and 1B, memory 109 is shown at a high level as providing a communications path among CPUs, main memory and I/O. It should be understood that this is a high level representation only, and that in fact memory bus 109 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface unit 105 and I/O bus 110 are shown as single respective units, system 100 may in fact contain multiple I/O bus interface units 105 and I/O buses 110. Additionally main memory 102 may be divided into portions associated with particular CPUs or sets of CPUs and particular buses, as in any of various so-called non-uniform memory access (NUMA) computer system architectures, such as those shown in FIGS. 1C and 1D.

Figure 1C:
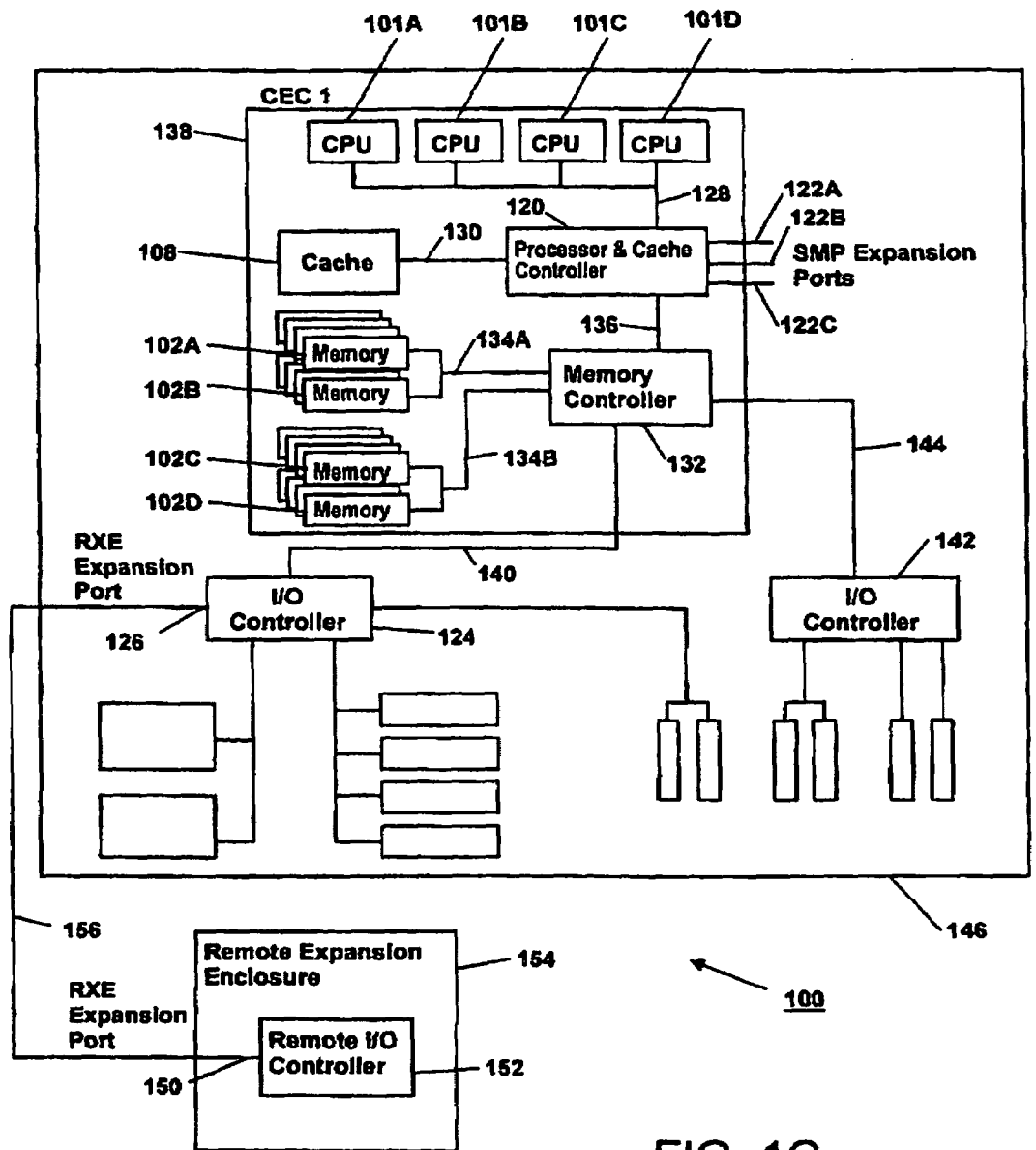
FIG. 1C is a high-level block diagram of the major hardware components of a multiple-CPU computer system with a processor/cache controller having symmetric multiprocessing (SMP) expansion ports and an I/O controller having an remote expansion enclosure (RXE) expansion port for utilizing an inter-chip interface, according to the preferred embodiment of the present invention.

FIG. 1C shows a high-level block diagram of the major hardware components of a multiple-CPU computer system 100 with a processor/cache controller 120 having symmetric multiprocessing (SMP) expansion ports 122A, 122B, 122C and an I/O controller 124 having an remote expansion enclosure (RXE) expansion port 126 for utilizing an inter-chip interface, according to the preferred embodiment of the present invention. CPUs 101A, 101B, 101C, 101D are connected to processor/cache controller 120 by a frontside bus 128. Cache 108 is connected to processor/cache controller 120 by a cache bus 130. Preferably, cache 108 services CPUs 101A, 101B, 101C, 101D. A memory controller 132 is connected to main memory 102A and 102B by memory bus 134A. Similarly, memory controller 132 is connected to main memory 102C and 102D by memory bus 134B. Main memory 102A, 102B, 102C, 102D is four-way interleaved so that the memory subsystem can supply data fast enough to match the throughput of CPUs 101A, 101B, 101C, 101D to which they are respectively associated. A bus 136 connects processor/cache controller 120 to memory controller 132. CPUs 101A, 101B, 101C, 101D; processor/cache controller 120; memory controller 132; main memory 102A, 102B, 102C, 102D; and cache 108 are mounted to central electronics complex (CEC) 138. The I/O controller 124 is connected to memory controller 132 by an I/O bus 140. Similarly, a second I/O controller 142 is connected to memory controller 132 by an I/O bus 144. The I/O controllers 124 and 142 are mounted to a centerplane (not shown) and an I/O board (not shown). The CEC 138, the centerplane and the I/O board are housed within a single enclosure 146. The chipset that comprises the processor/cache controller 120, memory controller 132, and I/O controllers 124 and 142 may be, for example, based on a conventional chipset, such as IBM XA-32 chipset available from International Business Machines Corporation, which has been modified to incorporate the present invention.

The RXE expansion port 126 of I/O controller 124 is connect to an RXE expansion port 150 of a remote I/O controller 152 using a serial link 156. The RXE expansion ports 126 and 150 are bi-directional. Remote I/O controller 152 is mounted to a remote I/O board that is housed in a remote enclosure 154. The serial link 156 is a remote I/O cable having multiple communication lines.

The SMP expansion ports 122A, 122B, 122C of processor/cache controller 120 may be used to connect CEC 138 to one or more other CECs through one or more serial links. For example, CEC 138 may be connected to another identical CEC using a pair of links to form an eight-way system. This example is discussed in greater detail below with reference to FIG. 1D. Alternatively, CEC 138 may be connected to three other identical CECs to form a sixteen-way system using three serial links. The SMP expansion ports 122A, 122B, 122C are bi-directional. Each serial link is a scalability cable having multiple communication lines.

Figure 1D:
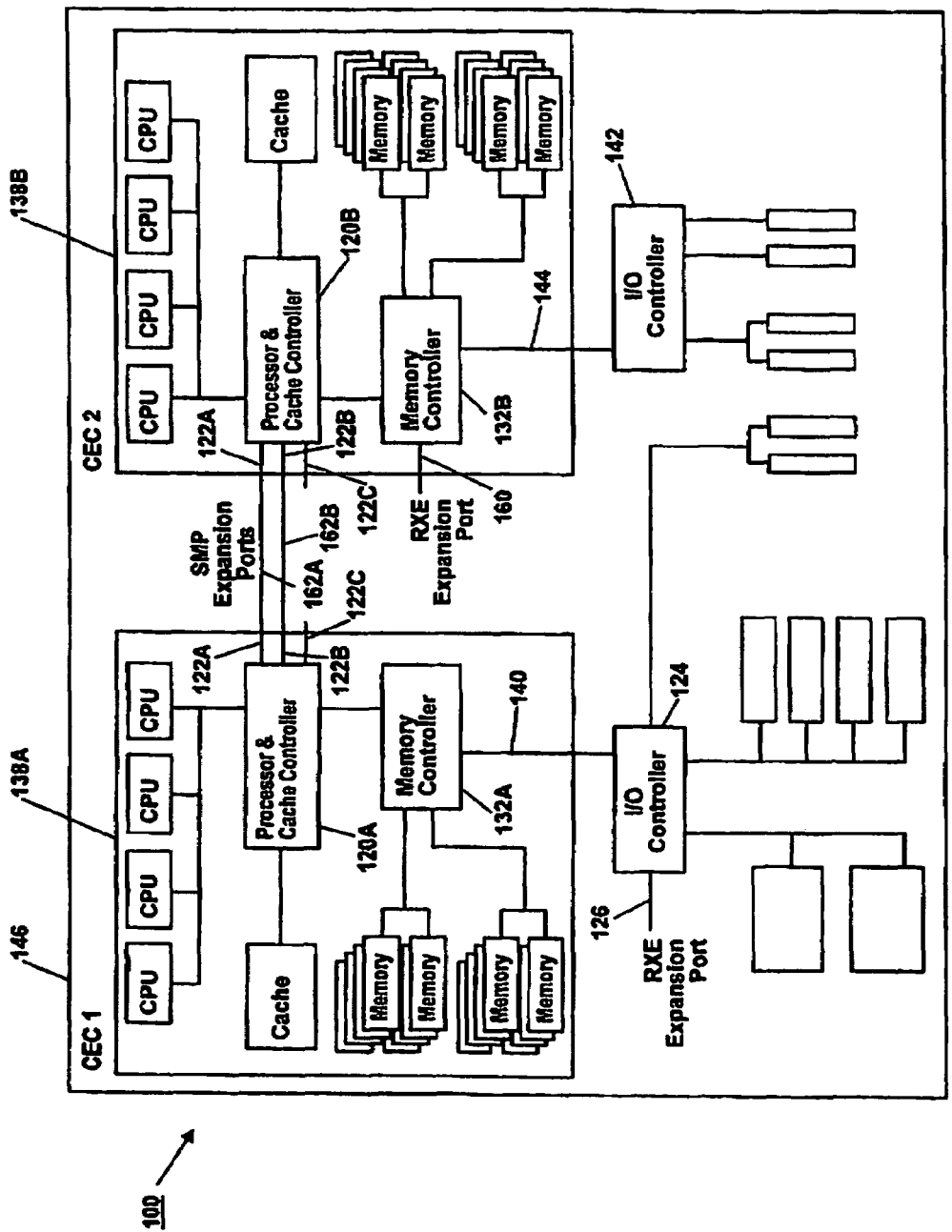
FIG. 1D is a high-level block diagram of the major hardware components of a multiple-CPU computer system with a pair of processor/cache controllers each having symmetric multiprocessing (SMP) expansion ports, an I/O controller having an remote expansion enclosure (RXE) expansion port, and a memory controller having an remote expansion enclosure (RXE) expansion port for utilizing an inter-chip interface, according to the preferred embodiment of the present invention.

FIG. 1D is a high-level block diagram of the major hardware components of a multiple-CPU computer system 100 with a pair of processor/cache controllers 120A, 120B each having symmetric multiprocessing (SMP) expansion ports 122A, 122B, 122C, an I/O controller 124 having an remote expansion enclosure (RXE) expansion port 126, and a memory controller 132B having an remote expansion enclosure (RXE) expansion port 160 for utilizing an inter-chip interface, according to the preferred embodiment of the present invention. CECs 138A and 138B are identical and connected to one another using a pair of serial links 162A, 162B to form an eight-way system. The use of two serial links 162A, 162B is preferred because it improves throughput beyond that of one serial link and provides load balancing. The third SMP expansion port 122C is unused in this eight-way configuration. The I/O controller 124 is connected to memory controller 132A by an I/O bus 140. Similarly, a second I/O controller 142 is connected to memory controller 132B by an I/O bus 144. The I/O controllers 124 and 142 are mounted to a centerplane (not shown) and an I/O board (not shown). The CECs 138A, 138B, the centerplane and the I/O board are preferably housed within a single enclosure 146. The SMP expansion ports 122A, 122B, 122C are bi-directional. Each serial link is a scalability cable having multiple communication lines. The chipset that comprises the processor/cache controllers 120A, 120B; memory controllers 132A, 132B and I/O controllers 124 and 142 may be, for example, based on a conventional chipset, such as IBM XA-32 chipset available from International Business Machines Corporation, which has been modified to incorporate the present invention.

The RXE expansion port 126 of I/O controller 124 may be used to connect to an RXE expansion port of a remote I/O controller using a serial link. This was discussed above with respect to FIG. 1C. In addition, the RXE expansion port 160 of memory controller 132B may be used to connect to an RXE expansion port of a remote I/O controller using a serial link. The RXE expansion ports 126 and 160 are bi-directional. In each case, the serial link is a remote I/O cable having multiple communication lines.

Figure 2:
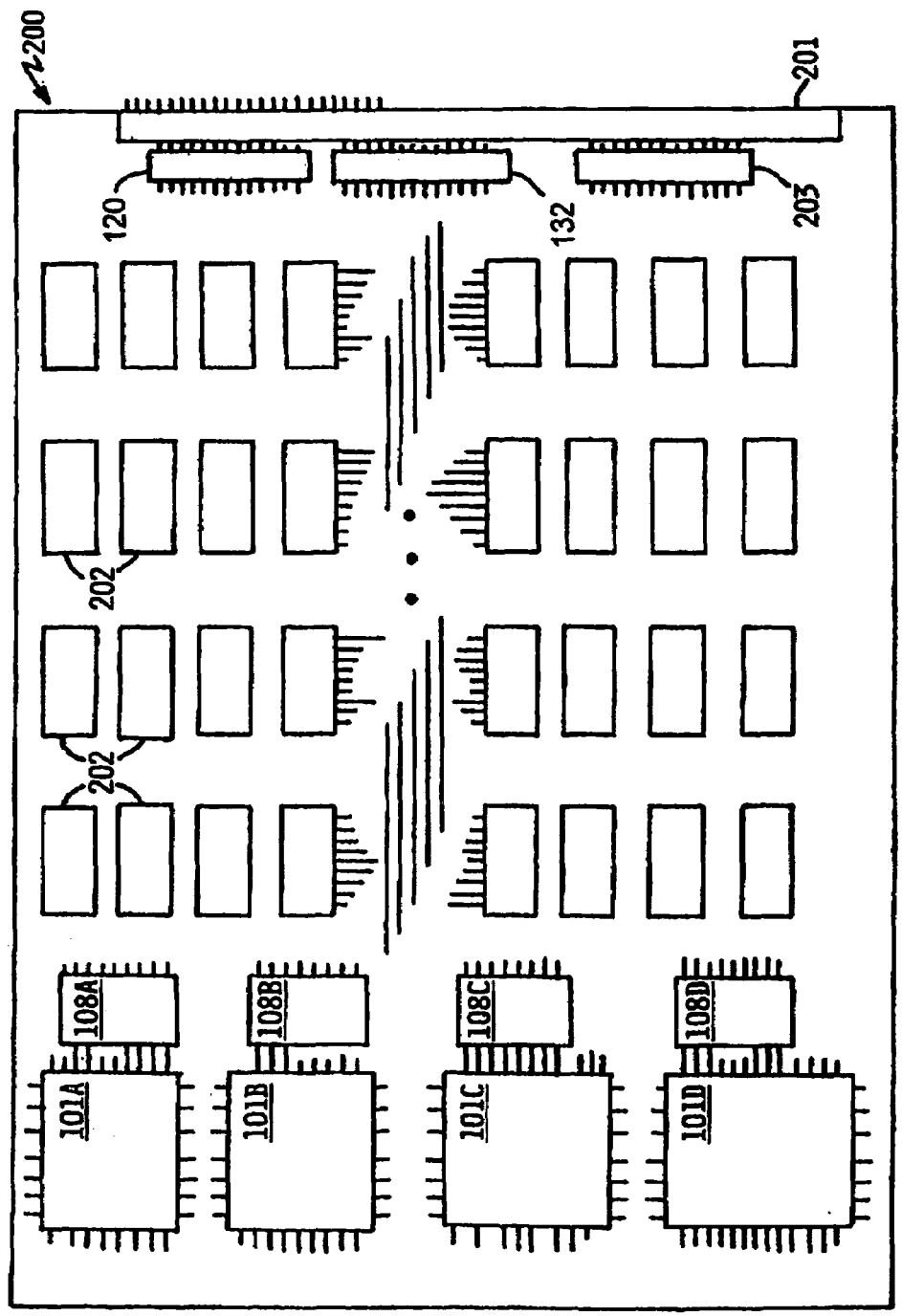
FIG. 2 is a simplified representation of a typical circuit card for mounting various components of computer system, according to the preferred embodiment.

FIG. 2 is a simplified representation of a typical circuit card for mounting various components of computer system 100, according to the preferred embodiment. Circuit card 200 is a thin, flat member having electrically conductive wire patterns on an insulator base material, such as fiberglass. Typically, a circuit card of any complexity has multiple layers of conductive patterns, which are separated by insulative layers to make a sandwich. Electronic components are mounted on one or both sides of circuit card 200. Any of various appropriate techniques now known or hereafter developed for construction of circuit cards and the components mounted thereon may be used.

Components mounted on circuit card 200 may include any of various integrated circuit modules, as well a discrete components such as resistors, capacitors, diodes, etc. (not shown). Circuit card 200 includes at least one connector 201 for communicating with other circuit cards or other components of computer system 100. FIG. 2 is intended as a high-level representation of a typical processor card of a multi-processor system, circuit card 200 having four processor modules 101A, 101B, 101C, 101D; cache memory modules 108A, 108B, 108C, 108D; processor/cache controller module 120; memory controller module 132; main memory modules 202; and interface module 203 for communicating with components external to card 200. However, it will be understood that the number and type of components mounted on a circuit card 200 in accordance with the present invention may vary. For example, circuit card 200 may correspond to CEC 138 in FIG. 1C and CECs 138A and 138B in FIG. 1D, with circuit card 200 containing a single cache memory module 108 instead of the four cache memory modules 108A, 108B, 108C, 108D. However, circuit card 200 need not be a processor card. For example, card 200 need not have any CPU modules, may contain one or more I/O processors or other communications modules with or without buffer memory, may contain only one memory, etc.

Figure 3:
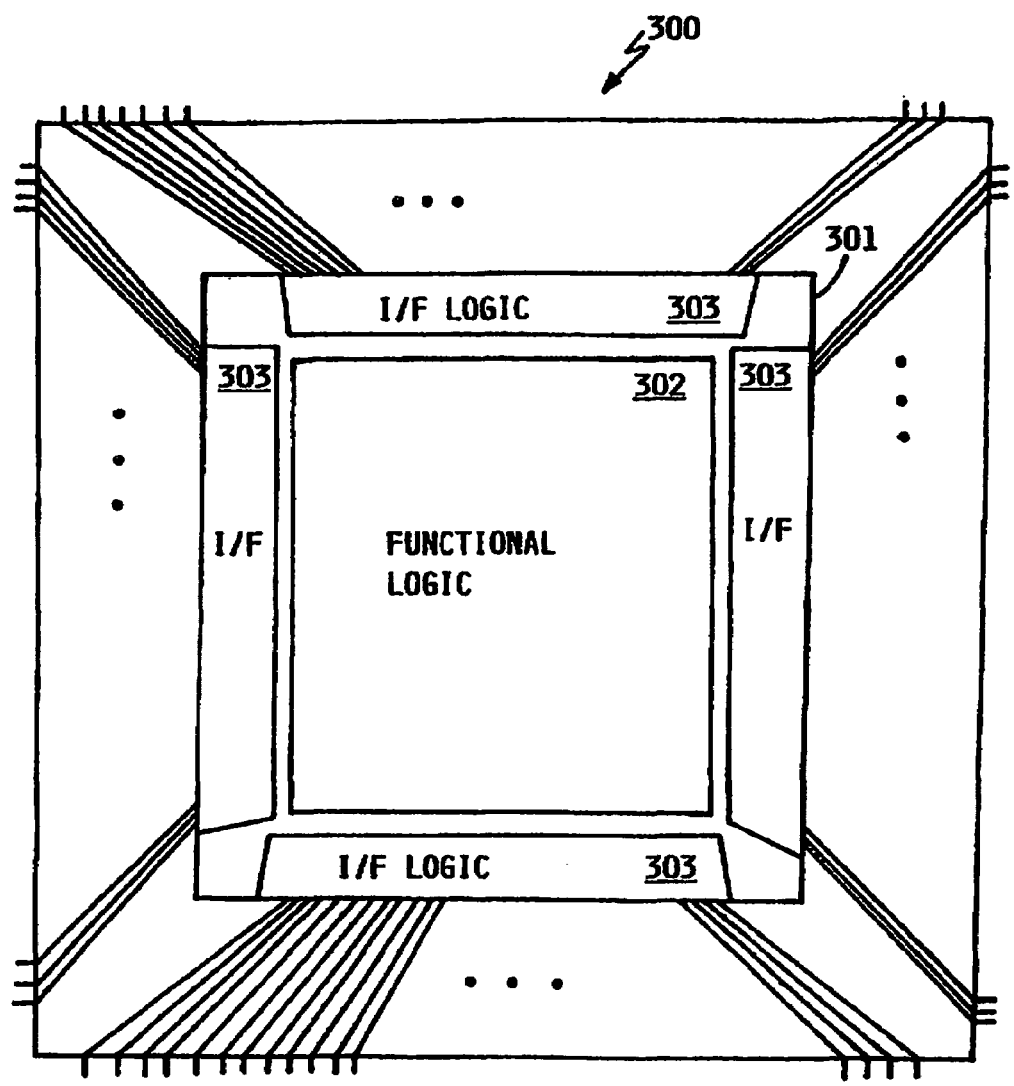
FIG. 3 is a simplified illustration of a typical integrated circuit module, according to the preferred embodiment.

FIG. 3 is a simplified illustration of a typical integrated circuit module, also called a "chip", such as is mounted on circuit card 200 (shown in FIG. 2), according to the preferred embodiment. Integrated circuit module 300, contains various electronic circuits and elements formed on a single semiconductor substrate 301, which is typically silicon, although other materials are possible, and which is encapsulated in a protective insulator. The electronic circuits and elements on substrate 301 are broadly categorized as functional logic 302 and interface logic 303.

Functional logic 302 performs the functions to which chip module 300 is dedicated. For example, if module 300 is a processor/cache controller, functional logic will typically include processor controller logic, cache controller logic, and so forth. If module 300 is a memory controller, functional logic will typically include memory controller logic, etc. If module 300 is an I/O controller or a remote I/O controller, functional logic will typically include I/O controller logic, etc. If module 300 is a CPU, functional logic will typically include instruction decoding logic, branching logic, arithmetic/logic units, registers, caches, and so forth. If module 300 is a memory module, functional logic will typically include an array of memory cells, addressing decode logic, etc.

Interface logic 303 provides and interface between functional elements of the module and elements external to module 300. Typically, interface logic 303 includes driver logic for driving an electrical signal to one or more external destinations, and receiver logic for receiving an external signal. Multiple conductive lines emanate from interface logic 303 and connect to I/O pins which extend from module 300. Although the I/O pins are shown in FIG. 3 along the four edges of module 300, such pins may be mounted differently, e.g., on fewer than all edges, or on the bottom of the module. If module 300 is a processor/cache controller, one or more of the conductive lines that emanate from interface logic 303 define each respective one of the SMP expansion ports. If module 300 is a memory controller, one or more of the conductive lines that emanate from interface logic 303 define the RXE expansion port. If module 300 is an I/O controller or a remote I/O controller, one or more of the conductive lines that emanate from interface logic 303 define the RXE expansion port.

Integrated circuit modules communicate with one another via external conductive lines in circuit card 200 which connect the interface logic of one module with the interface logic of another. In addition, one or more integrated circuit modules mounted on circuit card 200 communicate with one or more other integrated circuit modules (typically mounted on one or more other circuit cards) via one or more conductive lines (defining one or more links) which connect the interface logic of one module with the interface logic of one or more other modules. For example, a serial link (scalability cable) comprising one or more intermodule communication lines may connect one of the SMP expansion ports of one processor/cache controller to one of the SMP expansion ports of another processor/cache controller. Alternatively, a serial link (remote I/O cable) comprising one or more intermodule communication lines may connect the RXE expansion port of a memory controller or an I/O controller to the RXE expansion port of a remote I/O controller.

Figure 4:
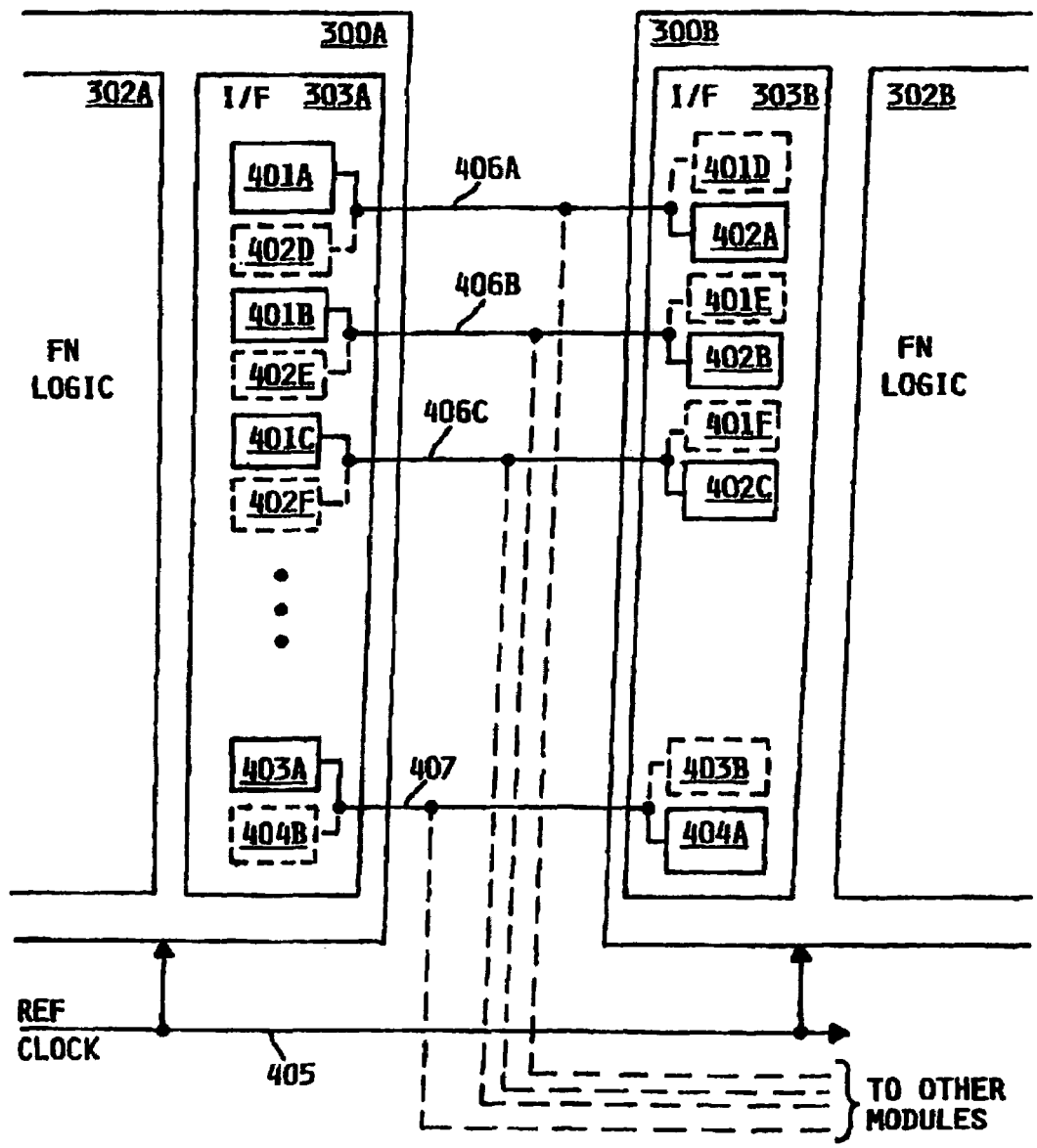
FIG. 4 is a simplified representation of two integrated circuit modules in communication with each other, according to the preferred embodiment.

FIG. 4 is a simplified representation of two modules 300A, 300B in communication with each other. Typically, data is communicated in parallel connections, buses or links, and so each data connection comprises multiple individual data bit lines 406A, 406B, 406C in parallel, each line representing one pre-defined bit of information. Functional logic 302A in the transmitting module 300A provides data to the transmitting module's interface logic 303A. Each line 406A-406C is driven to appropriate voltage levels representing a logical value by respective driver circuit 401A-401C. In the receiver interface logic 303B, receiver circuit 402A-402C for each line receives the driven signal and provides a respective logic signal to functional logic 302B in the receiving module 300B. For clarity of illustration, only three lines 406A-406C and corresponding drivers and receivers are illustrated in FIG. 4, it being understood that the actual number of lines is typically larger. For example, each of the two scalability cables typically has sixteen or seventeen lines. Similarly, the remote I/O cable typically has sixteen or seventeen lines.

A conductive clock line 407 is associated with the set of data bit lines 406A-406C, the clock line being used to transmit a clock signal for the data being transmitted on the data bit lines 406A-406C. Clock line 407 is driven by a driver circuit 403A in the transmitting module, and received by a receiver circuit 404A in the receiving module. For example, one of the lines in each of the two scalability cables is typically a clock line. Similarly, one of the lines in the remote I/O cable is typically a clock line. Alternatively, conductive clock line 407, driver circuit 403A and receiver circuit 404A may be omitted in favor of using clock recovery logic to recover the clock signal from at least one of the data bit lines 406A-406C in the receiving module.

In the preferred embodiment, the combination of data bit lines (406A, 406B, 406C, . . . ) and clock line 407, if any, comprises a serial link that connects an expansion port of interface logic 303A to an expansion port of interface logic 303B. For example, the serial link may connect one of the SMP expansion ports of one processor/cache controller to one of the SMP expansion ports of another processor/cache controller; or may connect the RXE expansion port of a memory controller to the RXE expansion port of a remote I/O controller; or may connect the RXE expansion port of an I/O controller to the RXE expansion port of a remote I/O controller or an I/O controller.

A conductive line or set of lines may be unidirectional, meaning that data runs only in one direction, or bi-directional. In the latter case, the interface logic 303A, 303B in each module will contain both driver logic and receiver logic. This is illustrated in FIG. 4 as dashed data receiver circuit elements 402D-402F and clock receiver element 404B in interface logic 303A, and as dashed data driver circuit elements 401D-401F and clock driver 403B in interface logic 303B. For clarity, data driver circuit is herein referred to generically as element 401, data receiver circuit as element 402, clock driver as element 403, clock receiver as element 404, and conductive bit line as element 406.

A conductive line or set of lines may run between two and only two modules, or may connect multiple modules, as shown by dashed line connections in FIG. 4. For example, multiple transmitting modules may transmit data through a line to a single receiving module; or a single transmitting module may transmit data through a line to multiple receiving modules; or multiple transmitting modules may transmit data through a line to multiple receiving modules. Where multiple modules have the potential to transmit data through a shared line, some protocol must exist to prevent simultaneous transmission by two or more modules. For example, the line may be allocated to different modules on a cycle-interleaved or similar time-sliced basis, or an arbitration process may be defined whereby a module wishing to transmit can obtain control of the line for a continuous number of cycles.

Each individual line 406 communicates data in a sequence of logic 1's and 0's, the sequence being synchronized with a clock signal on clock line 407. Preferably, the clock signal on line 407 is derived from an external reference clock signal which is used by at least one of modules 300A, 300B. For example, the clock signal on line 407 is either the same period as the reference clock signal on line 405, or some integral multiple of periods of the reference clock. Although derived from the reference clock, clock signal 407 is typically phase shifted some amount due to various transmission delays within module 300A and/or module 300B.

Figure 5:
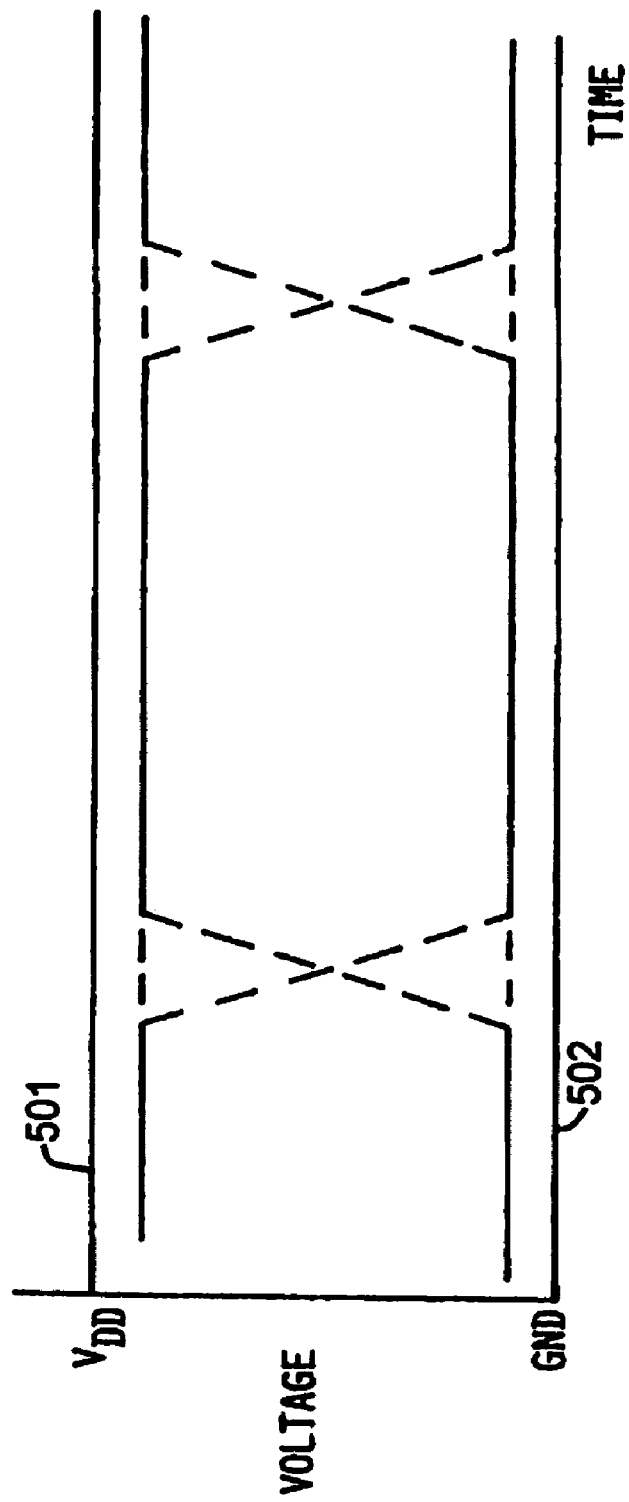
FIG. 5 is an idealized "eye-diagram" for characterizing an inter-module communication line.

A line signal received by receiver 402 may be characterized using an "eye-diagram". FIG. 5 is an idealized "eye-diagram". In an eye-diagram, the x-axis represents time, while the y-axis represents signal voltage detected by a receiver circuit. As shown in FIG. 5, the received voltage varies within a range which lies between the voltage of a power source ($V_{DD}$) 501 and ground 502. When a logic "1" is communicated on the line, it is driven to a voltage near $V_{DD}$; when a logic "0" is communicated, it is driven to a voltage near ground. Communications are synchronized to clock signal 407, so that at periodic intervals the voltage on the line may change state from a logic "1" to a logic "0", or vice-versa, or may stay the same. This is shown in FIG. 5 as the dashed line voltage shifts. Although the interval of voltage shift is the same as the clock cycle, the voltage shift may be phase offset from some clock transition due to various propagation delays in the driver circuits and transmission lines.

Figure 6:
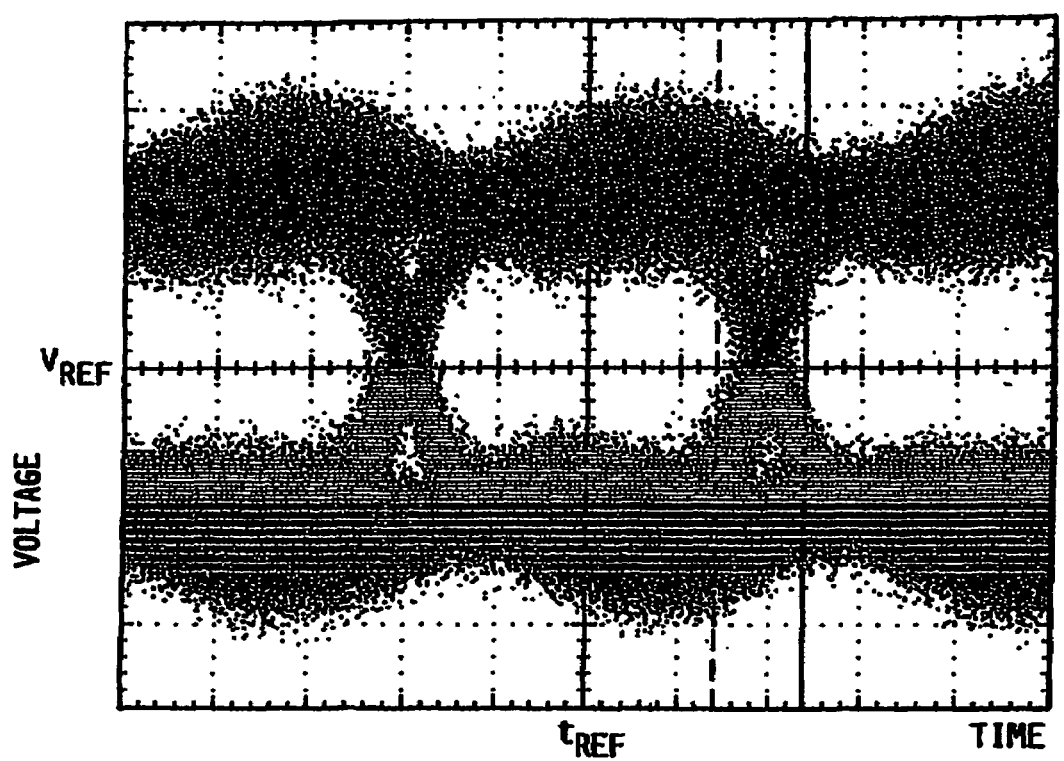
FIG. 6 represents an eye-diagram scatter plot of a typical communications line interface.

In a real system, the line voltage will not achieve such perfect uniformity as shown in the idealized eye-diagram of FIG. 5. FIG. 6 represents an eye-diagram scatter plot of data measurements from a typical communications line interface. The eye-diagram plot of FIG. 6 is a scattergram of discrete data measurements over many clock cycles, which trace the basic outline of an eye-diagram. Some measurements therefore correspond more closely to the ideal eye-diagram than others.

Referring to the scatter plot of FIG. 6, it will be observed that discrete data measurement points are thickest at the high and low logic levels, and another set of points is found near the transitions. In the middle region between the high and low logic levels, and between the transitions, there are virtually no data points.

A communications line receiver circuit 402 operates by comparing a reference voltage $V_{REF}$ to the voltage on line 406 at periodic intervals (sampling times) $t_{REF}$, where $t_{REF}$ is some offset phase from the clock signal. Referring to FIG. 6, if $V_{REF}$ is represented as a horizontal line in the eye-diagram and $t_{REF}$ as a vertical line, the intersection of the two lines should lie somewhere near the middle of the white space between high and low logic level and between voltage transitions. Specifically, this means that receiver circuit 402 should be designed so that $V_{REF}$ and $t_{REF}$ intersect near the middle of the open area in the eye-diagram. The closer $V_{REF}$ is to one of the nominal logic levels, the greater is the probability that random noise will cause a signal to cross the $V_{REF}$ threshold when it should not, and consequently cause a transmitted bit to be misread by the receiver circuit. Similarly, the closer $t_{REF}$ is to one of the transitions, the greater is the probability that some random event will alter the normal timing of the transition, and again cause a transmitted bit to be misread. Finally, since the circuits which generate $V_{REF}$ and $t_{REF}$ cannot be replicated with absolute precision for each and every one of a large number of manufactured systems, it is desirable that the system is designed so that $V_{REF}$ and $t_{REF}$ are nominally near the middle of the open area of the eye-diagram, in order to allow as much room as possible for manufacturing variations.

Referring again to FIG. 6, it will be observed that for a given $V_{REF}$ and $t_{REF}$ of a specific physical line connection, the intersection of the lines will lie in an area which is almost entirely devoid of data points, or which may have a few scattered data points, or which may have many data points. Any data points on the wrong side of a reference line represents the occurrence of a bit signal which may be misinterpreted by the receiver circuit, i.e., an error. Therefore, for a given $V_{REF}$ and $t_{REF}$ of a line, there will be a frequency, or rate, at which data points occur on the wrong side of the reference line, i.e., there will be an error rate. By varying one of the parameters $V_{REF}$ and $t_{REF}$, the error rate may be plotted as a function of the parameter. Typically, $t_{REF}$ is varied, although it would alternatively be possible to plot error rate as a function of $V_{REF}$.

Figure 7:
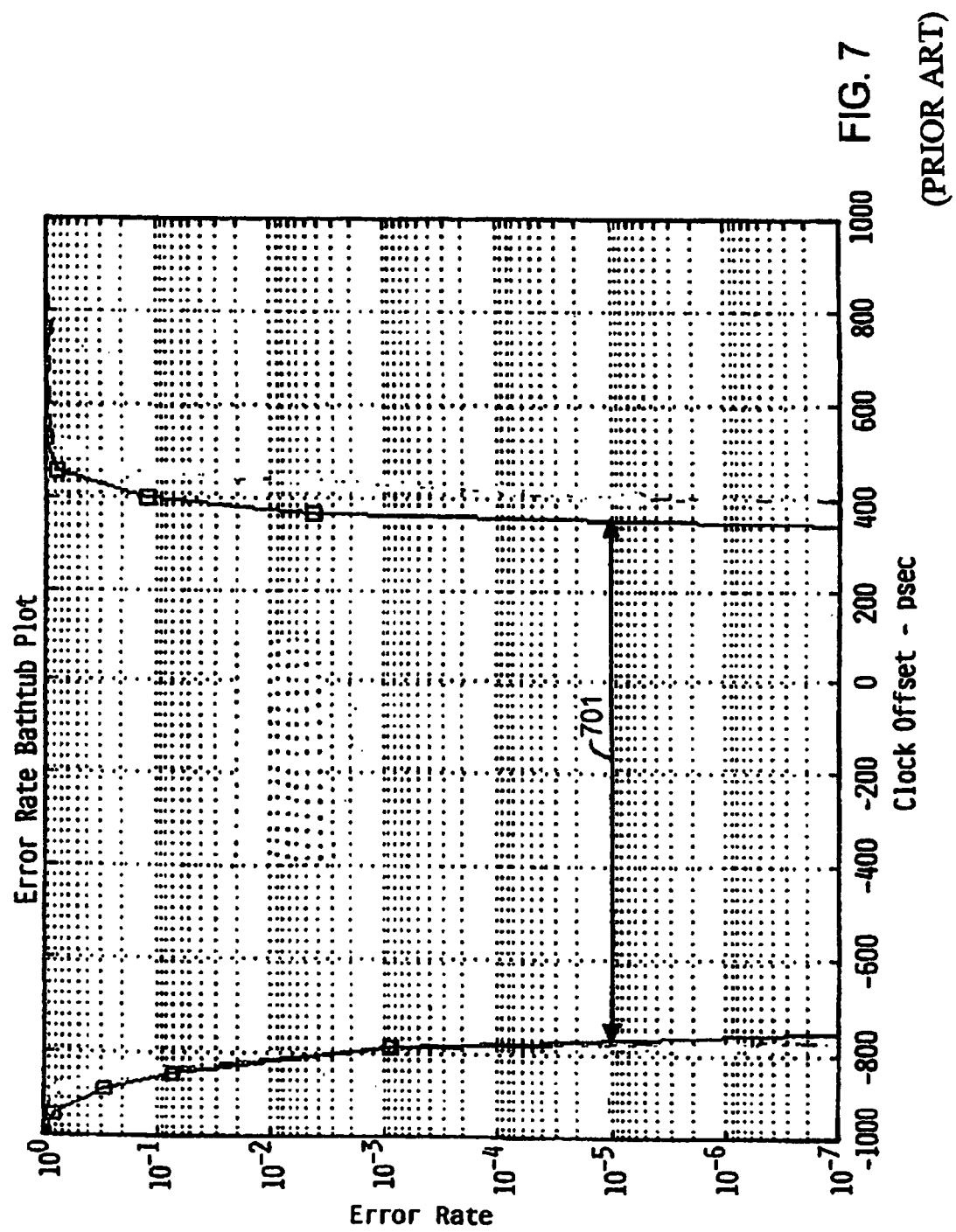
FIG. 7 is a typical "bathtub curve" plot of error rate as a function of clock offset.

FIG. 7 is a typical "bathtub curve" plot of error rate as a function of $t_{REF}$ for a specific physical line connection. In FIG. 7, $t_{REF}$ is represented as an offset time period or phase from the clock signal which regulates the line. The error rate is represented on a logarithmic scale, in which the top of the graph is $10^0$, i.e., 1, indicating that virtually every bit received is in error, and the lower portions indicating exponentially lower error rates, e.g., $10^{-1}$, $10^{-2}$, $10^{-3}$, etc. Typically, if the clock offset from some nominal clock phase is too great in either direction, the error rate approaches 1, while in a middle range, the error rate drops to a very low frequency. This gives the curve its characteristic "bathtub" shape. The graph of FIG. 7 bottoms out at an error rate of $10^{-7}$, but the actual error rate may be lower in the middle range, and may be so low as to be difficult to measure. The range of clock offset values at the bottom of the curve is significant, because for practical applications a system must have rates well below $10^{-7}$.

An important advantage of constructing a bathtub curve is that it provides a "window of guardband" (also referred to herein as "timing margin" and "eye opening") in the results. A window of guardband is the width of the bathtub curve at a given error rate. The timing margin at an error rate of $10^{-5}$ is shown by a line with arrowheads labeled as element 701. In FIG. 7, at an error rate of $10^{-5}$, the timing margin is −770 psec through +360 psec; whereas at an error rate of $10^{-7}$, the timing margin is −760 psec through +350 psec.

Figure 8:
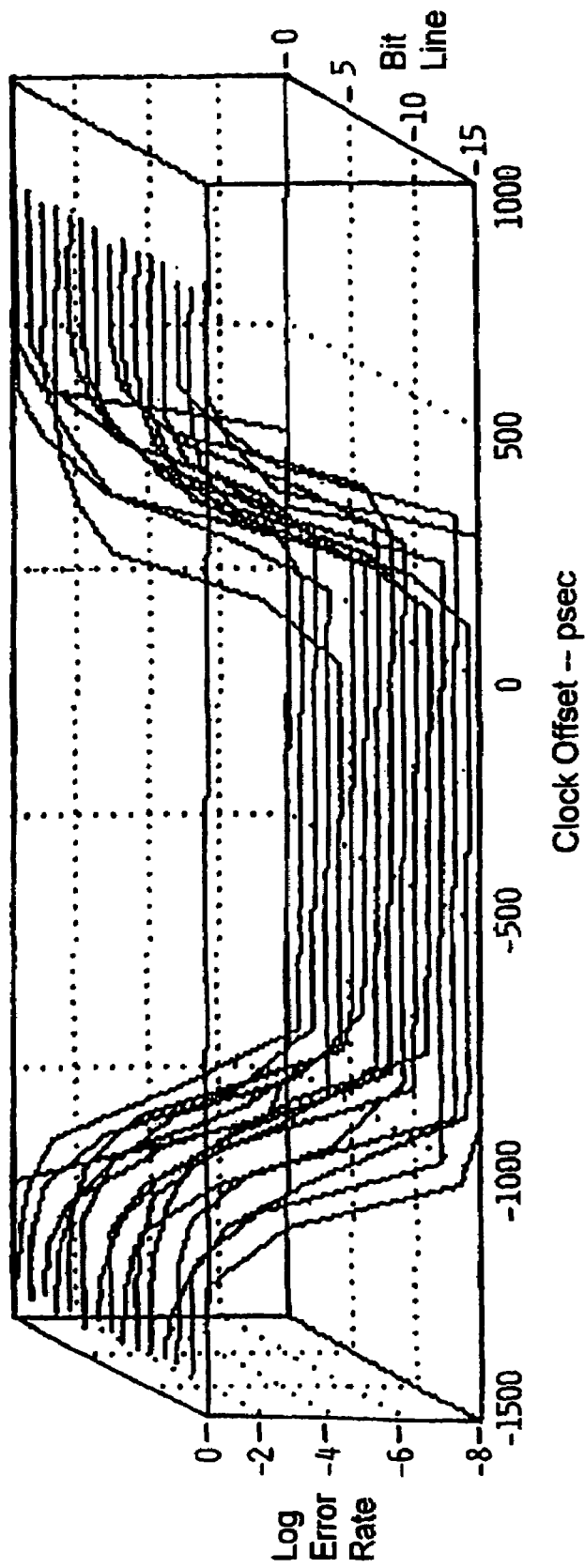
FIG. 8 represents a set of bathtub curves for different bit lines of a common data bus.

As previously noted, the line characteristics of each individual line may vary from those of any other line, even when the lines are part of a common group of lines (e.g., in a link) or bus connecting the same pair or set of integrated circuit modules. FIG. 8 represents a set of bathtub curves for different bit lines of a common data bus, arranged side-by-side to form a 3-dimensional figure. It will be observed that each bathtub curve follows the same general profile, in that each curve approaches an error rate of 1 at sufficiently high offsets in either direction from the nominal clock phase, and that the error rate is low in the middle. However, it will also be observed that the various bathtub curves vary in their precise measurements. Specifically, the range of the curve "bottom", meaning that the error rate is below $10^{-8}$, varies for each line.

It is desirable to obtain error rates well below $10^{-7}$ or $10^{-8}$. Due to the many variations in individual lines as well as manufacturing tolerances, it is difficult to select nominal values for $V_{REF}$ and $t_{REF}$ which will guarantee sufficiently low error rates in all cases. For any given line, as $V_{REF}$ moves away from its optimal value, the range of clock offset values $t_{REF}$ which will provide a sufficiently low error rate becomes narrower. At some point, the bathtub curve will not bottom out at a sufficiently low error rate at all. Similarly, as $t_{REF}$ moves away from its optimal value, it may eventually reach the rise in the bathtub curve and produce unacceptable errors. These optimal values will vary for each individual line, and manufacturing tolerances provide further variation for each individual manufactured system.

In accordance with the preferred embodiment of the present invention, this problem is addressed using a secondary data path in the receiving module in addition to the primary data path. An inter-chip interface is designed having the capability to characterize error rates for each individual line 406 under different clock offset values, and in particular, to measure low error rates under realistic operating conditions. The data in the secondary data path is latched using a clock signal that is skewed relative to a clock signal used to latch the data in the primary data path. The data latched from the primary and secondary data paths is compared, and any errors are recorded. Because the primary data path is not impacted by the test cycle, the test cycle may be run while data associated with applications running on the system is being transmitted across the lines.

Figure 9:
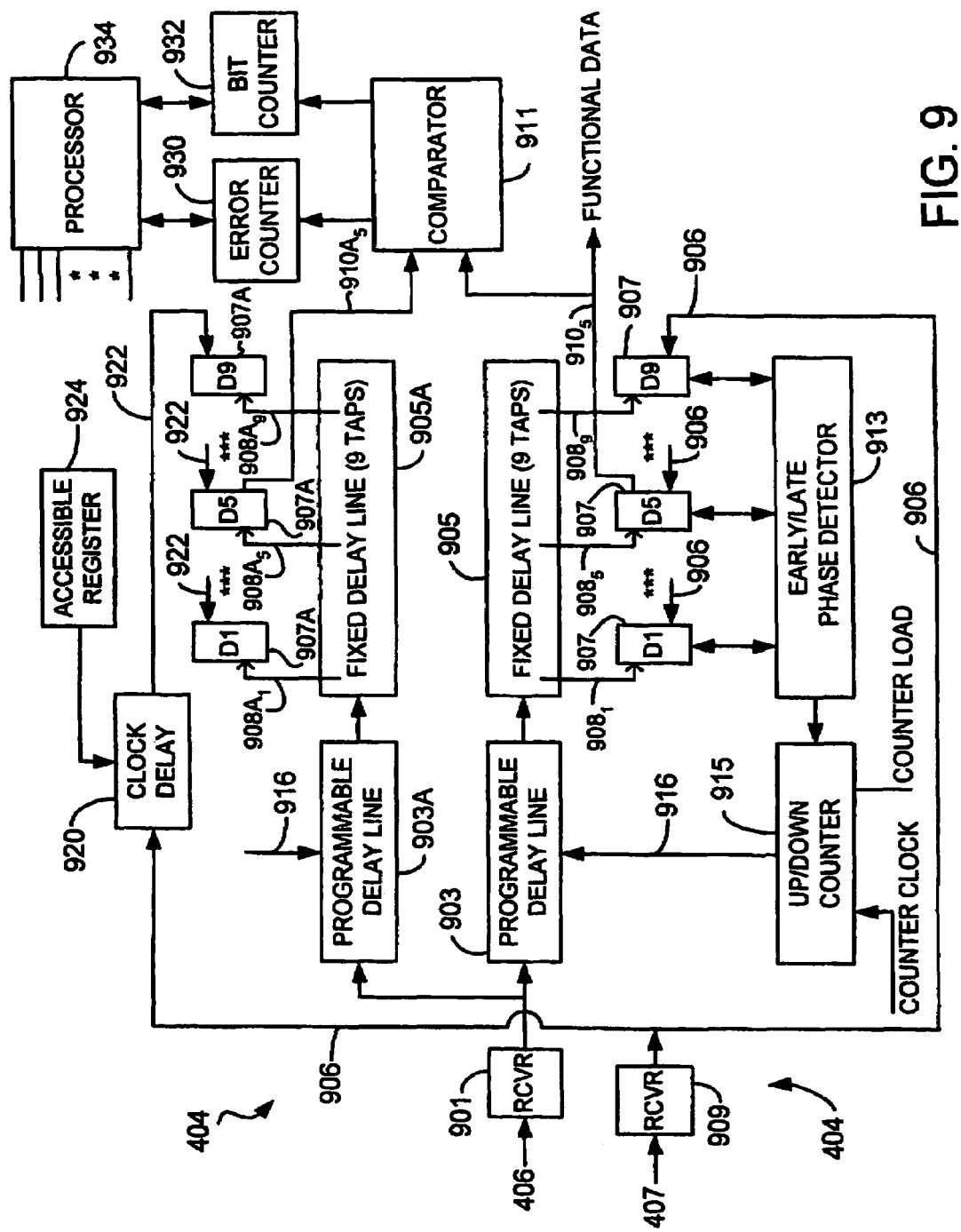
FIG. 9 is a high-level circuit diagram showing the major elements of a receiver circuit for a line of an inter-chip interface, according to the preferred embodiment.

FIG. 9 is a high level circuit diagram showing the major elements of a receiver circuit 402 for a data bit line 406 of an inter-chip interface 303 (shown in FIG. 3), according to the preferred embodiment of the present invention. Receiver circuit 402 includes a differential receiver 901 which receives the external data signal on line 406. Preferably, the differential receiver 901 is a variable reference differential receiver that permits the reference voltage $V_{REF}$ to be varied, thereby allowing the interface to be tuned with respect to $V_{REF}$. Examples of such variable reference differential receivers and techniques for their implementation in tuning inter-chip interfaces are disclosed in U.S. Pat. No. 6,735,543, issued May 11, 2004, entitled "Method and Apparatus for Testing, Characterizing and Tuning a Chip Interface", which is herein incorporated by reference.

Differential receiver 901 provides input to a programmable delay line 903, which in turn provides input to a fixed delay line 905. Programmable delay line 903 and fixed delay line 905, which has multiple taps, permit the signal delay to be varied, thereby allowing the interface to be tuned with respect to signal delay. The technique by which the signal delay is varied using programmable delay line 903 and fixed delay line 905 is discussed below. However, other apparatus and techniques for varying the signal delay to tune the interface are possible. Examples of such apparatus and techniques for their implementation in tuning inter-chip interfaces are disclosed in U.S. Pat. No. 6,735,543, issued May 11, 2004, entitled "Method and Apparatus for Testing, Characterizing and Tuning a Chip Interface", which is herein incorporated by reference.

In the preferred embodiment shown in FIG. 9, fixed delay line 905 has nine taps. This number of taps is merely exemplary. The fixed delay line 905 may have any number of taps. In the case of the preferred embodiment shown in FIG. 9, the nine taps of fixed delay line 905 respectively provide nine data inputs $908_1$-$908_9$ to master/slave latches 907. For clarity of illustration, only three data inputs $908_1$, $908_5$, $908_9$ to latches 907 provided by the taps of delay line 905 are shown in FIG. 9. The tap having the shortest fixed delay provides data input $908_1$ to latch 907, which is labeled as element D1. The tap having the longest fixed delay provides data input $908_9$ to latch 907, which is labeled as element D9. The tap having the median fixed delay provides data input $908_5$ to latch 907, which is labeled as element D5.

Each latch 907 is clocked by an externally received clock signal received on clock line 407. Alternatively, each latch 907 may be clocked by a clock signal recovered from data bit line 406 by clock recovery logic, such as a data and clock recovery (DCR) unit. A differential receiver 909 receives the clock signal on line 407, and provides a clock signal on a clock line 906 to each latch 907. Preferably, the differential receiver 909 is a variable reference differential receiver to permit the clock reference voltage $V_{REF}$ to be varied, thereby allowing the interface to be tuned with respect to clock reference voltage $V_{REF}$. Examples of such variable reference differential receivers and techniques for their implementation in tuning inter-chip interfaces are disclosed in U.S. Pat. No. 6,735,543, issued May 11, 2004, entitled "Method and Apparatus for Testing, Characterizing and Tuning a Chip Interface", which is herein incorporated by reference.

For clarity of illustration, only the clock line 906 from differential receiver 909 to latch D9 is completely shown in FIG. 9. Although not completely shown, the clock line 906 from differential receiver 909 also is provided to latches D1-D8 (FIG. 9 only shows the input portion of the clock line 906 for latches D1 and D5). A variable delay circuit (not shown) may be interposed between differential receiver 909 and the latches 907 to provide a clock delay before the clock triggers the latches 907 and to permit this clock delay to be varied, thereby allowing the interface to be tuned with respect to clock delay. Examples of such variable delay circuits and techniques for their implementation in tuning inter-chip interfaces are disclosed in U.S. Pat. No. 6,735,543, issued May 11, 2004, entitled "Method and Apparatus for Testing, Characterizing and Tuning a Chip Interface", which is herein incorporated by reference.

The output of a single one of latches 907 is selected to provide output data to functional logic 302 (shown in FIG. 3) in the receiver module, as well as to a comparator 911 in the receiver module. For clarity of illustration, only the data line $910_5$ emanating from the latch D5 is completely shown in FIG. 9. Although not shown, equivalent data lines $910_1$-$910_4$ and $910_6$-$910_9$ respectively emanate from each of latches D1-D4 and D6-D9.

As mentioned above, programmable delay line 903 and fixed delay line 905 permit the signal delay to be varied, thereby allowing the interface to be tuned with respect to signal delay. The phase centering technique used to accomplish this is now discussed. Phase centering is typically accomplished prior to the test cycle and is typically not performed during the test cycle. Because the phase centering technique is conventional and well known in the art, and is typically not used during the test cycle, it is only briefly described herein. An early/late phase detector 913 samples each of the latches 907, determines whether the phase of data signal of each sample is early or late relative to the clock signal, and selects a single one of the latches 907. The latch 907 having the most centered data signal relative to the clock signal is selected by early/late phase detector 913. The selected latch 907 provides output data to functional logic 302 (shown in FIG. 3), as well as to comparator 911. In addition, early/late phase detector 913 compares the sums of the early samples and the late samples. Based on the result of this comparison, early/late phase detector 913 provides an up/down signal to an up/down counter 915. The up/down counter 915 also receives a counter clock signal and is provided with a counter load. The up/down counter 915 provides an adjustment signal on signal line 916 to programmable delay line 903 based on the up/down signal. The resulting shift in the phase of the data signal produced by programmable delay line 903 feeds back to the early/late phase detector 913 and the phase centering technique is repeated. During normal operation of the system, this phase centering technique constantly tunes the interface. During a test cycle, however, programmable delay line 903 and fixed delay line 905 are frozen, preferably at their last-tuned state.

According to the preferred embodiment, receiver circuit 402 includes both a primary data path and a secondary data path. The primary data path includes programmable delay line 903, fixed delay line 905 and latches 907; whereas the secondary data path includes a programmable delay line 903A, a fixed delay line 905A and latches 907A. The programmable delay line 903A in the secondary data path is identical to programmable delay line 903 in the primary data path. The fixed delay line 905A in the secondary data path is identical to fixed delay line 905 in the primary data path. The latches 907A in the secondary data path are identical to latches 907 in the primary data path.

As discussed above, differential receiver 901 provides input to programmable delay line 903. Differential receiver 901 also provides that same input to a programmable delay line 903A, which in turn provides input to a fixed delay line 905A. Programmable delay line 903A and fixed delay line 905A, which has multiple taps just like fixed delay line 905, permit the signal delay to be varied in the secondary delay path exactly as in the primary path. This is accomplished by up/down counter 916 providing the same adjustment signal to both programmable delay line 903A and programmable delay line 903 and by early/late phase detector 913 selecting a latch 907A in the secondary data path that corresponds to the latch 907 it selects in the primary data path.

In the preferred embodiment shown in FIG. 9, the nine taps of fixed delay line 905A in the secondary path respectively provide nine data inputs 908A$_1$-908A$_9$ to master/slave latches 907A. For clarity of illustration, only three data inputs 908A$_1$, 908A$_5$, 908A$_9$ to latches 907A provided by the taps of delay line 905A are shown in FIG. 9. The tap having the shortest fixed delay provides data input 908A$_1$, to latch 907A, which is labeled as element D1. The tap having the longest fixed delay provides data input 908A$_9$ to latch 907A, which is labeled as element D9. The tap having the median fixed delay provides data input 908A$_5$ to latch 907A, which is labeled as element D5.

Each latch 907A in the secondary data path is clocked by an externally received clock signal received on clock line 407 and delayed by a clock delay 920. Alternatively, each latch 907A may be clocked by a clock signal recovered from data bit line 406 by clock recovery logic, such as a data and clock recovery (DCR) unit, and delayed by clock delay 920. The differential receiver 909 provides the same clock signal to each latch 907 in primary data path and clock delay 920 associated with the secondary data path.

The clock delay 920 is a variable delay circuit that provides a clock signal on clock line 922 for latching the secondary data path by skewing, in a plurality of delay increments and/or decrements, the clock signal on line 906 for latching the primary data path. Clock delay 922 is controlled by an accessible register 924. A processor 934, which calculates the error rate as discussed below, preferably has access to accessible register 924 in order to increment and/or decrement the clock delay. Clock delay 922 can be implemented in a variety of ways well known in the art. For example, relatively simple delay circuits are disclosed in U.S. Pat. No. 6,735,543, issued May 11, 2004, entitled "Method and Apparatus for Testing, Characterizing and Tuning a Chip Interface", which is herein incorporated by reference. Additional more sophisticated implementations of delay circuits having fine resolution are disclosed in U.S. Pat. No. 6,421,784, issued Jul. 16, 2002, entitled "Programmable Delay Circuit having a Fine Delay Element Selectively Receives Input Signal and Output Signal of Course Delay Element", which is herein incorporated by reference.

The output of a single one of latches 907A is selected to provide output data to comparator 911. For clarity of illustration, only the data line 910A$_5$ emanating from the latch D5 is completely shown in FIG. 9. Although not shown, equivalent data lines 910A$_1$-910A$_4$ and 910A$_6$-910A$_9$ respectively emanate from each of latches D1-D4 and D6-D9 in the secondary data path.

The comparator 911 compares the output of the selected latch 907 in the primary data path and the output of the selected latch 907A in the secondary data path. In the preferred embodiment shown in FIG. 9, when the latch labeled as D5 is selected in the primary and secondary data paths, comparator 911 compares the data on data line 910$_5$ in the primary data path and the data on data line 910A$_5$ in the secondary data path.

Comparator 911 increments an error counter 930 upon the occurrence of any miscompares. Also, comparator 911 decrements a bit counter 932 for every comparison. Preferably, the counters support testing a large number of test cycles to accurately determine the bounds of a bathtub curve at low error frequencies. In this regard, bit counter 932 is preferably a counter register that is decremented with each comparison of comparator 911. The register is initialized to a test cycle count, and outputs a signal to a processor 934 when the cycle limit is reached. Preferably, the counters support testing a large number of test cycles to accurately determine the bounds of a bathtub curve at low error frequencies. When the test cycle is reached, the processor 934 calculates the error rate by accessing the contents of error counter 930 and dividing the error count by the test cycle count. The processor 394 may also have access to accessible register 924 to vary the clock delay. One of the advantage of certain embodiments described herein is the ability to characterize an inter-chip interface under operating conditions, while data associated with application programs running on the system is transmitted across the inter-chip interface, over a large number of cycles, and thus measure very low error rates in real-time. A typical interface specification may require an error rate on the order of $10^{-14}$, although not all test runs will be required to go that high. Accordingly, it is preferred that bit counter 932 contain 32 or more bits, with the capability to count to $2^{32}$ or more cycles, and more preferably, that the counter contain 48 bits, with the capability to count to $2^{48}$ cycles.

Each receiver circuit 402 for a single data bit line 406 preferably contains a respective differential receiver 901, programmable delay lines 903, 903A, fixed delay lines 905, 905A, latches 907, 907A, early/late phase detector 913, up/down counter 915, comparator 911, clock delay 920, and accessible register 924. However, the external clock line 407 and differential receiver 909 are typically shared among many external inter-chip bit line inputs to the receiving module. Similarly, error counter 930, bit counter 932 and processor 934 are typically shared among many external inter-chip bit inputs to the receiving module. In an alternative implementation, one or more additional components associated with the secondary data path, i.e., the programmable delay line 903A, fixed delay line 905A, latches 907A, clock delay 920 and/or accessible register 924, may be shared among external inter-chip bit line inputs to the receiving module. This may be accomplished through the use of a multiplexer, for example.

Preferably, error counter 930, bit counter 932 and processor 934 support the simultaneous testing of all lines and counting all errors detected, or counting of errors only on isolated groups of lines, or on a single line. The ability to count errors on a single line or group of lines may be significant where an isolated line or group of lines is determined to be a problem, and it is desirable to observe the effect of varying the clock delay in that line or group of lines in order to more fully understand the nature of the problem.

In operation, a characterizable interface in accordance with the preferred embodiment of the present invention supports the accurate determination of low frequency intermittent errors on an individual line basis for a plurality of signal delay settings. Characterization can be accomplished under realistic operating conditions when data associated with an application program is transmitted across the inter-chip communication lines. Because the primary data path is not impacted by the test cycle, the test cycle may be run while data associated with applications running on the system are transmitted across the inter-chip communication lines. Systems designers may therefore test, characterize, and monitor the inter-chip interfaces on an individual line basis after the chips and the circuit boards to which they are mounted have been designed and constructed. While the primary benefit is assumed to be understanding the interface in the system design phase, such capability could further be used to test, characterize and monitor chips during manufacturing to account for manufacturing variations, or in the field to account for variations in operating environment, aging, and so forth. Alternatively, characterization could be performed as part of system initialization upon installation in the user's location.

Figure 10:
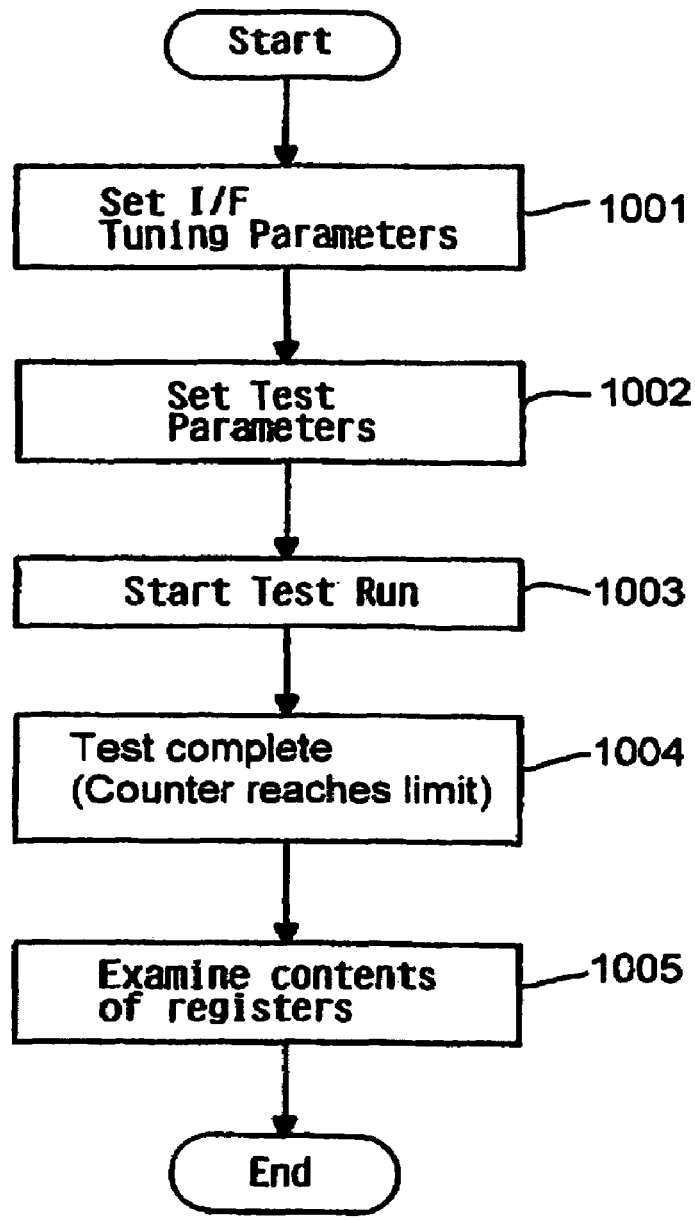
FIG. 10 is a high-level flow diagram illustrating the main steps of a test run, according to the preferred embodiment.

For all types of characterization, the basic unit of information gathering is a test run. FIG. 10 is a high-level flow diagram illustrating the main steps of a test run, according to the preferred embodiment. As shown in FIG. 10, the integrated circuit modules of the interface to be examined are first initialized to the state of the tuning parameters to be used for the test (step 1001). If the inter-chip interface is suspected of being impacted by a particular application program or programs running on the system, then those application program or programs are run on the system so that data associated with the application program or programs is transferred across the inter-chip interface. In the receiving module, if differential receiver 901 is a variable reference differential receiver, then the control lines for $V_{REF}$ variation in differential receiver 901 are set to desired values. In the receiving module, if differential receiver 909 is a variable reference differential receiver, then the control lines for $V_{REF}$ variation in differential receiver 909 are set to desired values. In the receiving module, if a delay circuit is interposed between differential receiver 909 and latches 907, then the control lines for delay variation in the delay circuit are set to desired values. In the receiving module, the programmable delay lines 903, 903A and the selected taps of the fixed delay line 905, 905 are made identical and frozen at desired values.

The parameters of the test are set in the modules (step 1002). Specifically, the line or lines to be tested are selected. For example, for the selected line or lines, the bit counter 932 is set to the desired number of test cycles. Also for the selected line or lines, the error counter 930 is set to zero.

The test is then commenced with an appropriate test start or reset signal (not shown) to comparator 911 and/or bit counter 932 (step 1003).

When bit counter 932 reaches the pre-designated limit, it sends a limit signal to processor 934, which accesses the contents in error counter 930 and calculates the error rate. Additionally, the limit signal from bit counter 932 may trigger an external indication (not shown) that the test is complete (step 1004), or software may wait a predetermined time and check for test completion.

The tester can access the error rate calculated by the processor 934, or examine the contents of error counter 930 (step 1005).

The basic procedure of FIG. 10 can be used with many variations to obtain detailed information about the interface. As one example, although by no means the only such example, it is possible to use this procedure to construct error rate "bathtub" curves which plot error rate as a function of offset $t_{REF}$ from the clock signal. This is accomplished by conducting a series of test runs, in which the delay values of clock delay 920 is varied with each test run, which other interface tuning parameters (i.e., $V_{REF}$ and driver power) are held constant, preferably at some nominal value. The errors accumulated during each respective test run are then placed against the delay offset to which the clock delay 920 was set to produce a bathtub curve. It is possible to test a single line at a time, and thus to obtain an accurate bathtub plot of each individual line of an interface, i.e., to produce data similar to the presented in FIG. 8.

Figure 11:
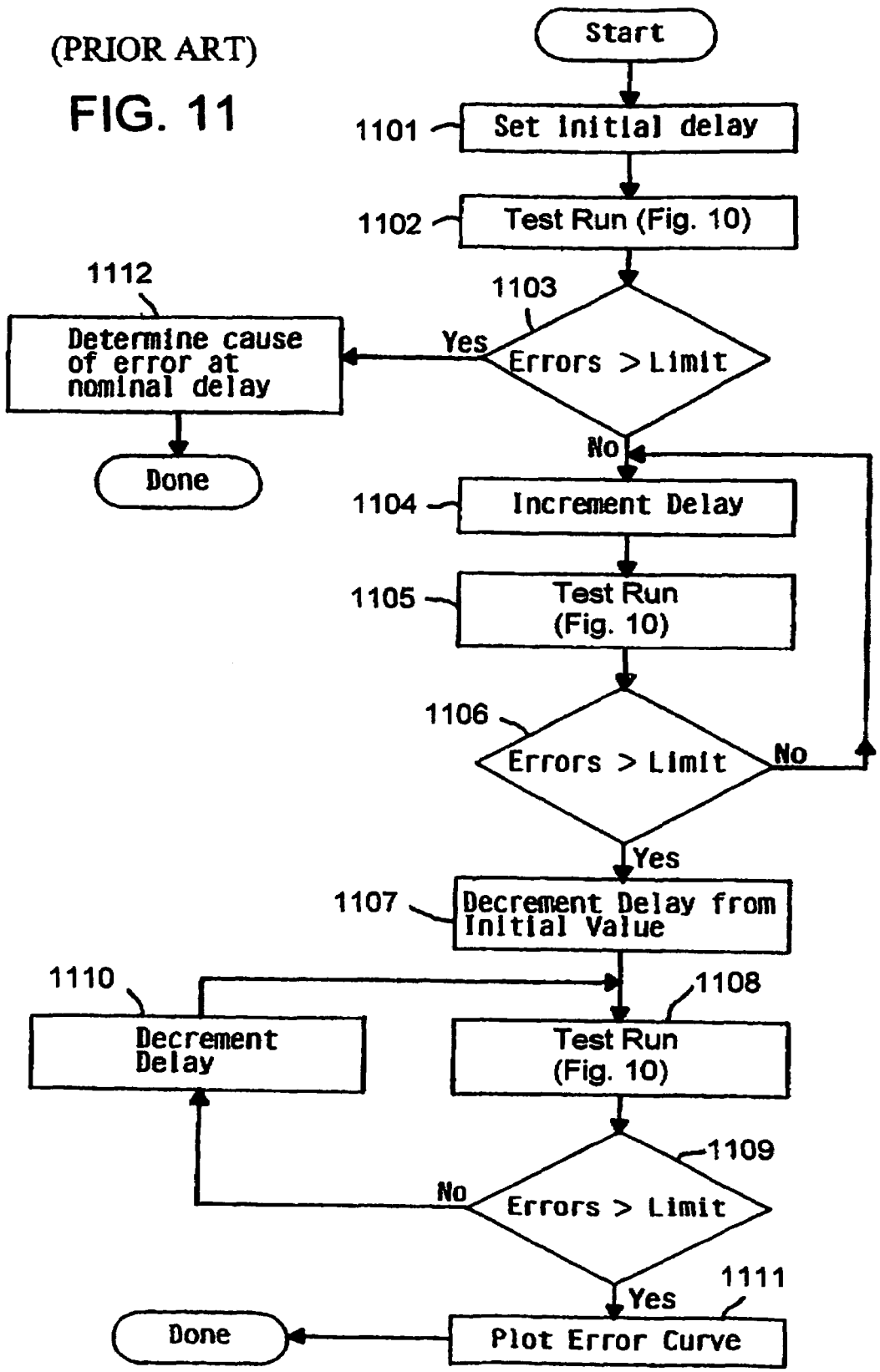
FIG. 11 is a high-level flow diagram illustrating a process for obtaining and error rate "bathtub" curve, according to the preferred embodiment.

A process for plotting a single bathtub curve is shown in FIG. 11. As shown in FIG. 11, an initial delay value is established (such as a nominal delay value) (step 1101), and a test is run over a large number of cycles conducted at this value (step 1102). If the error rate is below some predetermined limit (step 1103), the delay value is then incremented (step 1104), and the test run repeated (step 1105), until the error rate is greater than some high limit (e.g., close to 0.5), at which point further delays will only make the error rate worse, and the "Y" branch from block 1106 is taken. The delay is then set to the initial delay value, decremented by one unit (step 1107), and the test run repeated (step 1108). If error rate is less than the limit (step 1109), the delay is decremented (step 1110), and the run repeated. When the error rate reaches the limit, the data collection ends because sufficient data points have been obtained. The curve is then plotted using the error data collected from the various test runs (step 1111). If, at step 1103, the errors are already above the limit, there may be something wrong with the logic, or the nominal delay value may give erroneous data when some other delay value will provide acceptable results. In this case, experimenting with different parameters of $V_{REF}$, driver power and/or delay may produce an acceptable error rate or otherwise lead to some understanding of the cause of the error (step 1112).

The process illustrated in FIG. 11 is simply one illustration of a process for obtaining error rate data, and can be varied in many particulars. For example, the starting point of delay could be some high delay value or some low delay value; the incremental delay might initially be high (in the vicinity of the bathtub trough), and could be made finer as the error rate starts to increase near the edges of the "bathtub"; it might be possible to test multiple lines simultaneously in the trough (where error rates are very low), and separate individual lines only near the edges of the trough; etc. Furthermore, it will be understood that a similar process could be used to obtain error rate bathtub curves showing the change in error rate as a function of some other parameter, such as $V_{REF}$. That is, the secondary data path could be modified to provide a $V_{REF}$ which is varied relative to that of the primary data path. However, it is more typical to obtain such data as a function of different delay values in the receiver.

The process illustrated in FIG. 11, could further involve finding the edges of a bathtub curve to establish an acceptable timing delay range, determining whether the "eye" is open enough (timing margin is large enough), and selecting delay values near the center of the range.

Although the present invention has been described in detail with reference to certain examples thereof, it may be also embodied in other specific forms without departing from the essential spirit or attributes thereof. For example, those skilled in the art will appreciate that the present invention is capable of being distributed as a set of instructions for a fabrication facility ("fab") encoded onto a signal bearing media (e.g., a Release Interface Tape or "RIT," a "tape-out," a "GDS2," etc). Examples of suitable signal bearing media include, but are not limited to: (i) information permanently stored on non-writable storage media, such as read only memory devices within a computer such as CD-ROM disks readable by a CD-ROM drive; (ii) alterable information stored on writable storage media, such as floppy disks within a diskette drive, a CD-R disk, a CD-RW disk, or hard disk drive; or (iii) information conveyed to a computer by a communications medium, such as the Internet. Accordingly, such signal bearing media, when carrying instructions that direct the creation of the circuits and systems of the present invention, represent embodiments of the present invention.

Embodiments of the present invention may also be delivered as part of a service engagement with a client corporation, nonprofit organization, government entity, internal organizational structure, or the like. Aspects of these embodiments may also include analyzing specifications from the client entity, creating recommendations responsive to the analysis, generating designs for circuitry that implements some or all of recommendations, delivering fabrication instructions for the designs, and testing the resulting circuitry.

Although a specific embodiment of the invention has been disclosed along with certain alternatives, it will be recognized by those skilled in the art that additional variations in the form and detail may be made within the scope of the following claims.

What is claimed is:

1. A digital data processing system, comprising:
a first integrated circuit module having an expansion port;
a second integrated circuit module having an expansion port;
a serial link comprising at least one intermodule communication line connecting the expansion ports of the first and second integrated circuit modules;
a data driver circuit in the first module for transmitting data from the first module to the second module across the at least one intermodule communication line;
a data receiver circuit in the second module for receiving the data transmitted across the at least one intermodule communication line and transmitting the data across a primary data path and a secondary data path;
a first latch in the second module for latching the data transmitted across the primary data path based on a first clock signal;
a second latch in the second module for latching the data transmitted across the secondary data path based on a second clock signal, the second clock signal being skewed relative to the first clock signal;
comparison logic in the second module that compares the data latched from the primary data path with the data latched from the secondary data path;
logging logic in the second module that records the occurrence of any miscompares in the comparison logic;
wherein the primary and secondary data paths each include a programmable delay line and a fixed delay line having a plurality of taps, wherein the plurality of taps of the fixed delay line in the primary data path respectively provide the data transmitted across the primary data path at a plurality of fixed delays to a plurality of master/slave latches for latching the data transmitted across the primary data path, wherein the plurality of taps of the fixed delay line in the secondary data path respectively provide the data transmitted across the secondary data path at a plurality of fixed delays to a plurality of master/slave latches for latching the data transmitted across the secondary data path, wherein each of the master/slave latches for latching the data transmitted across the primary data path is clocked by the first clock signal and each of the master/slave latches for latching the data transmitted across the secondary data path is clocked by the second clock signal, wherein the programmable delay line and a tap selection of the fixed delay line in at least the primary data path are tuned during normal operation, wherein the programmable delay line and the tap selection of the fixed delay line in the primary and secondary data paths are equalized and frozen during a test cycle to monitor an error rate while data associated with an application program is transmitted across the at least one intermodule communication line, wherein the first latch is one of the master/slave latches for latching the data transmitted across the primary data path, and wherein the second latch is one of the master/slave latches for latching the data transmitted across the secondary data path.

2. The digital data processing system as recited in claim 1, further comprising a variable delay circuit in the second module for providing the second clock signal by skewing the first clock signal.

3. The digital data processing system as recited in claim 1, further comprising:
a clock driver circuit in the first module for transmitting the first clock signal from the first module to the second module across the at least one intermodule communication line;
a clock receiver circuit in the second module for receiving the first clock signal transmitted across the at least one intermodule communication line.

4. The digital data processing system as recited in claim 1, further comprising clock recovery logic in the second module that recovers the first data clock signal from the data transmitted across the at least one intermodule communication line.

5. The digital data processing system as recited in claim 1, wherein the first and second modules are mounted to at least one circuit card assembly for mounting electronic components and providing electrical connections to the electronic components.

6. The digital data processing system as recited in claim 5, wherein the at least one circuit card assembly comprises a central electronics complex (CEC).

7. The digital data processing system as recited in claim 1, wherein the first module is mounted to a first central electronics complex (CEC) and the second module is mounted to a second CEC.

8. The digital data processing system as recited in claim 7, wherein one of the first and second modules comprises a first processor/cache controller mounted to the first CEC, the other of the first and second modules comprises a second processor/cache controller mounted to the second CEC, and the at least one intermodule communication line comprises a scalability cable connecting a first symmetric multiprocessor (SMP) expansion port of the first processor/cache controller and a second SMP expansion port of the second processor/cache controller.

9. The digital data processing system as recited in claim 1, wherein one of the first and second modules is mounted to a central electronics complex (CEC) and the other of the first and second modules is mounted to a remote input/output (I/O) board.

10. The digital data processing system as recited in claim 9, wherein one of the first and second modules comprises a memory controller mounted to the CEC, the other of the first and second modules comprises a remote I/O controller mounted to the remote I/O board, and the at least one intermodule communication line comprises a remote I/O cable connecting a first remote expansion enclosure (RXE) expansion port of the memory controller and a second RXE expansion port of the remote I/O controller.

11. The digital data processing system as recited in claim 1, wherein one of the first and second modules is mounted in an enclosure and the other of the first and second modules is mounted to a remote I/O board in a remote enclosure.

12. The digital data processing system as recited in claim 11, wherein one of the first and second modules comprises an I/O controller mounted in the enclosure, the other of the first and second modules comprises a remote I/O controller mounted to the remote I/O board in the remote enclosure, and the at least one intermodule communication line comprises a remote I/O cable connecting a first remote expansion enclosure (RXE) expansion port of the I/O controller and a second RXE expansion port of the remote I/O controller.

13. The digital data processing system as recited in claim 1, wherein the digital data processing system comprises a plurality of intermodule communication lines connecting the first and second modules, the digital data processing system further comprising:
at least one test cycle counter that independently records, for each respective one of the plurality of intermodule communication lines, a value indicative of a number of bits transmitted during a test cycle to monitor an error rate;
at least one processor that independently calculates, for each respective one of the plurality of intermodule communication lines, the error rate based on a value recorded by the logging logic indicative of the number of miscompares for each respective one of the plurality of intermodule communication lines during the test cycle and the value recorded by the test cycle counter indicative of the number of bits transmitted by each respective one of the plurality of intermodule communication lines during the test cycle.

14. The digital data processing system as recited in claim 13, further comprising at least one variable delay circuit in the second module for providing the second clock signal by skewing the first clock signal in a plurality of delay changes, and wherein the at least one processor independently calculates, for each respective one of the plurality of intermodule communication lines, the error rate at each of the delay changes.

15. The digital data processing system as recited in claim 1, wherein the digital data processing system comprises a plurality of intermodule communication lines connecting the first and second modules, the digital data processing system further comprising:
selection logic in the second module that selects for test one of the plurality of intermodule communication lines;
a test cycle counter that records, for the selected one of the plurality of intermodule communication lines, a value indicative of a number of bits transmitted during a test cycle to monitor an error rate;
a processor that calculates, for the selected one of the plurality of intermodule communication lines, the error rate based on a value recorded by the logging logic indicative of the number of miscompares during the test cycle and the value recorded by the test cycle counter indicative of the number of bits transmitted during the test cycle.

16. The digital data processing system as recited in claim 15, further comprising at least one variable delay circuit in the second module for providing the second clock signal by skewing the first clock signal in a plurality of delay changes, and wherein the processor calculates, for the selected one of the plurality of intermodule communication lines, the error rate at each of the delay changes.

17. The digital data processing system as recited in claim 15, wherein the selection logic sequentially selects for test each respective one of at least a subset of the plurality of intermodule communication lines.

18. The digital data processing system as recited in claim 1, wherein the at least one intermodule communication line comprises at least one bi-directional communication line, the digital data processing system further comprising:
a data driver circuit in the second module for transmitting data from the second module to the first module across the bi-directional intermodule communication line;
a data receiver circuit in the first module for receiving the data transmitted across the bi-directional intermodule communication line and transmitting the data across a primary data path and a secondary data path;
a first latch in the first module for latching the data transmitted across the first module's primary data path based on a first timing clock signal;
a second latch in the first module for latching the data transmitted across the first module's secondary data path based on a second timing clock signal, the second timing clock signal being skewed relative to the first timing clock signal;
comparison logic in the first module that compares the data latched from the first module's primary data path with the data latched from the first module's secondary data path;
logging logic in the first module that records the occurrence of any miscompares in the first module's comparison logic.

19. A circuit card assembly for a digital data system, comprising:
a circuit card;
an integrated circuit module mounted to the circuit card, the integrated circuit module having an expansion port;
a serial link comprising at least one intermodule communication line connecting the expansion port of the module to an expansion port of at least one other integrated circuit module;
a data receiver circuit in the module for receiving data transmitted across the at least one intermodule communication line from another integrated circuit module and transmitting the data across a primary data path and a secondary data path;

a first latch in the module for latching the data transmitted across the primary data path based on a first clock signal;

a second latch in the module for latching the data transmitted across the secondary data path based on a second clock signal, the second clock signal being skewed relative to the first clock signal;

comparison logic in the module that compares the data latched from the primary data path with the data latched from the secondary data path;

logging logic in the module that records the occurrence of any miscompares in the comparison logic;

wherein the primary and secondary data paths each include a programmable delay line and a fixed delay line having a plurality of taps, wherein the plurality of taps of the fixed delay line in the primary data path respectively provide the data transmitted across the primary data path at a plurality of fixed delays to a plurality of master/slave latches for latching the data transmitted across the primary data path, wherein the plurality of taps of the fixed delay line in the secondary data path respectively provide the data transmitted across the secondary data path at a plurality of fixed delays to a plurality of master/slave latches for latching the data transmitted across the secondary data path, wherein each of the master/slave latches for latching the data transmitted across the primary data path is clocked by the first clock signal and each of the master/slave latches for latching the data transmitted across the secondary data path is clocked by the second clock signal, wherein the programmable delay line and a tap selection of the fixed delay line in at least the primary data path are tuned during normal operation, wherein the programmable delay line and the tap selection of the fixed delay line in the primary and secondary data paths are equalized and frozen during a test cycle to monitor an error rate while data associated with an application program is transmitted across the at least one intermodule communication line, wherein the first latch is one of the master/slave latches for latching the data transmitted across the primary data path, and wherein the second latch is one of the master/slave latches for latching the data transmitted across the secondary data path.

20. An integrated circuit module for a digital data system, comprising:

an intermodule interface for communicating with at least one other integrated circuit module of the digital data system via a serial link, the intermodule interface comprising at least one intermodule communication line connection connecting an expansion port of the integrated circuit module to an expansion port of the at least one other integrated circuit module;

a data receiver circuit for receiving data transmitted across the at least one intermodule communication line from another integrated circuit module and transmitting the data across a primary data path and a secondary data path;

a first latch for latching the data transmitted across the primary data path based on a first clock signal;

a second latch for latching the data transmitted across the secondary data path based on a second clock signal, the second clock signal being skewed relative to the first clock signal;

comparison logic that compares the data latched from the primary data path with the data latched from the secondary data path;

logging logic that records the occurrence of any miscompares in the comparison logic;

wherein the primary and secondary data paths each include a programmable delay line and a fixed delay line having a plurality of taps, wherein the plurality of taps of the fixed delay line in the primary data path respectively provide the data transmitted across the primary data path at a plurality of fixed delays to a plurality of master/slave latches for latching the data transmitted across the primary data path, wherein the plurality of taps of the fixed delay line in the secondary data path respectively provide the data transmitted across the secondary data path at a plurality of fixed delays to a plurality of master/slave latches for latching the data transmitted across the secondary data path, wherein each of the master/slave latches for latching the data transmitted across the primary data path is clocked by the first clock signal and each of the master/slave latches for latching the data transmitted across the secondary data path is clocked by the second clock signal, wherein the programmable delay line and a tap selection of the fixed delay line in at least the primary data path are tuned during normal operation, wherein the programmable delay line and the tap selection of the fixed delay line in the primary and secondary data paths are equalized and frozen during a test cycle to monitor an error rate while data associated with an application program is transmitted across the at least one intermodule communication line, wherein the first latch is one of the master/slave latches for latching the data transmitted across the primary data path, and wherein the second latch is one of the master/slave latches for latching the data transmitted across the secondary data path.

21. A method for characterizing an inter-chip interface, comprising:

(a) transmitting data from an expansion port of a first integrated circuit module to an expansion port of a second integrated circuit module across a serial link comprising at least one intermodule communication line;

(b) receiving the data transmitted across the at least one intermodule communication line and transmitting the data across a primary data path and a secondary data path;

(c) latching the data transmitted across the primary data path based on a first clock signal;

(d) latching the data transmitted across the secondary data path based on a second clock signal, the second clock signal being skewed relative to the first clock signal;

(e) comparing the data latched from the primary data path with the data latched from the secondary data path;

(f) logging any miscompares between the data latched from the primary data path and the data latched from the secondary data path;

equalizing and freezing a programmable delay line and a tap selection of a fixed delay line in each of the primary and secondary data paths during a test cycle to monitor an error rate;

wherein the primary and secondary data paths each include a programmable delay line and a fixed delay line having a plurality of taps, wherein the plurality of taps of the fixed delay line in the primary data path respectively provide the data transmitted across the primary data path at a plurality of fixed delays to a plurality of master/slave latches for latching the data transmitted across the primary data path, wherein the plurality of taps of the fixed delay line in the secondary data path respectively provide the data transmitted across the secondary data path at a plurality of fixed delays to a plurality of master/slave latches for latching the data transmitted across the secondary data path, wherein each of the master/slave latches for latching the data transmitted across the primary data path is clocked by the first clock signal and each of the master/slave latches for latching the data transmitted across the secondary data path is clocked by the second clock signal, wherein step (c) includes the step of selecting one of the master/slave latches for latching the data transmitted across the primary data path, and wherein step (d) includes the step of selecting one of the master/slave latches for latching the data transmitted across the secondary data path.

22. The method for characterizing an inter-chip interface as recited in claim 21, wherein acts (b) through (f) are performed by the second module.

23. The method for characterizing an inter-chip interface as recited in claim 21, further comprising:
(g) providing the second clock signal by skewing the first clock signal in a plurality of delay changes using a variable delay circuit.

24. The method for characterizing an inter-chip interface as recited in claim 23, wherein acts (b) through (g) are performed by the second module.

25. The method for characterizing an inter-chip interface as recited in claim 23, wherein acts (b) through (f) are performed multiple times, each time corresponding to a different respective one of the delay changes, to determine an error rate as a function of clock skew.

26. The method for characterizing an inter-chip interface as recited in claim 25, further comprising:
(h) determining a timing margin by plotting a bathtub curve using the determined error rates as a function of clock skew.

27. The method for characterizing an inter-chip interface as recited in claim 26, wherein the at least one intermodule communication line comprises a plurality of intermodule communication lines, and wherein acts (a) through (h) are performed multiple times, each time corresponding to a different respective one of the plurality of intermodule communication lines, to determine a timing margin for each of the plurality of intermodule communication lines by plotting a plurality of bathtub curves.

28. The method for characterizing an inter-chip interface as recited in claim 21, further comprising:
setting a test cycle counter in the second module to count a predetermined number of bits transmitted during a test cycle, and automatically stopping the logging step (f) when the predetermined number of bits is reached.

29. The method for characterizing an inter-chip interface as recited in claim 21, wherein acts (a) through (f) are performed during a product design phase for a digital data processing device.

30. The method for characterizing an inter-chip interface as recited in claim 21, wherein acts (a) through (f) are performed in the field while an application program is running on a digital data processing device, and wherein the data transmitted across the at least one intermodule communication line during a test cycle comprises data associated with the application program.

31. The method for characterizing an inter-chip interface as recited in claim 21, further comprising:
transmitting the first clock signal from the first module to the second module across the at least one intermodule communication line;
receiving the first clock signal transmitted across the at least one intermodule communication line.

32. The method for characterizing an inter-chip interface as recited in claim 21, further comprising:
recovering the first data clock signal from the data signal transmitted across the at least one intermodule communication line using clock recovery logic.

33. A computer program product, comprising:
(a) fabrication instructions that direct the creation of an integrated circuit module for a digital data system, comprising:
an intermodule interface for communicating with at least one other integrated circuit module of the digital data system via a serial link, the intermodule interface comprising at least one intermodule communication line connection connecting an expansion port of the integrated circuit module to an expansion port of the at least one other integrated circuit module;
a data receiver circuit for receiving data transmitted across the at least one intermodule communication line from another integrated circuit module and transmitting the data across a primary data path and a secondary data path;
a first latch for latching the data transmitted across the primary data path based on a first clock signal;
a second latch for latching the data transmitted across the secondary data path based on a second clock signal, the second clock signal being skewed relative to the first clock signal;
comparison logic that compares the data latched from the primary data path with the data latched from the secondary data path;
logging logic that records the occurrence of any miscompares in the comparison logic; and
(b) a signal bearing media comprising storage media bearing the fabrication instructions;
wherein the primary and secondary data paths each include a programmable delay line and a fixed delay line having a plurality of taps, wherein the plurality of taps of the fixed delay line in the primary data path respectively provide the data transmitted across the primary data path at a plurality of fixed delays to a plurality of master/slave latches for latching the data transmitted across the primary data path, wherein the plurality of taps of the fixed delay line in the secondary data path respectively provide the data transmitted across the secondary data path at a plurality of fixed delays to a plurality of master/slave latches for latching the data transmitted across the secondary data path, wherein each of the master/slave latches for latching the data transmitted across the primary data path is clocked by the first clock signal and each of the master/slave latches for latching the data transmitted across the secondary data path is clocked by the second clock signal, wherein the programmable delay line and a tap selection of the fixed delay line in at least the primary data path are tuned during normal operation, wherein the programmable delay line and the tap selection of the fixed delay line in the primary and secondary data paths are equalized and frozen during a test cycle to monitor an error rate while data associated with an application program is transmitted across the at least one intermodule communication line, wherein the first latch is one of the master/slave latches for latching the data transmitted across the primary data path, and wherein the second latch is one of the master/slave latches for latching the data transmitted across the secondary data path.

* * * * *